United States Patent
Brushett et al.

(10) Patent No.: US 10,658,848 B2
(45) Date of Patent: *May 19, 2020

(54) MATERIALS FOR USE WITH AQUEOUS REDOX FLOW BATTERIES AND RELATED METHODS AND SYSTEMS

(71) Applicants: Massachusetts Institute of Technology, Cambridge, MA (US); UChicago Argonne, LLC, Chicago, IL (US)

(72) Inventors: Fikile Richard Brushett, Cambridge, MA (US); Andrew Norbert Jansen, Bolingbrook, IL (US); John Thomas Vaughey, Elmhurst, IL (US); Liang Su, Medfield, MA (US); Jarrod D. Milshtein, Cambridge, MA (US)

(73) Assignees: Massachusetts Institute of Technology, Cambridge, MA (US); UChicago Argonne, LLC, Chicago, IL (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/785,009

(22) Filed: Oct. 16, 2017

(65) Prior Publication Data
US 2018/0102660 A1  Apr. 12, 2018

Related U.S. Application Data

(63) Continuation of application No. 14/625,417, filed on Feb. 18, 2015, now Pat. No. 9,812,883.

(Continued)

(51) Int. Cl.
*H01M 8/18* (2006.01)
*H02J 7/00* (2006.01)
(Continued)

(52) U.S. Cl.
CPC ............... *H02J 7/00* (2013.01); *H01M 4/58* (2013.01); *H01M 4/608* (2013.01); *H01M 8/0236* (2013.01); *H01M 8/188* (2013.01); *H01M 8/20* (2013.01); *H01M 8/0215* (2013.01); *Y02E 60/528* (2013.01)

(58) Field of Classification Search
None
See application file for complete search history.

(56) References Cited

U.S. PATENT DOCUMENTS 9,300,000 B2   3/2016  Jansen et al.
9,812,883 B2  11/2017  Brushett et al.
(Continued)

OTHER PUBLICATIONS

International Search Report and Written Opinion dated May 14, 2015 for Application No. PCT/US2015/016323.
(Continued)

*Primary Examiner* — Wojciech Haske
(74) *Attorney, Agent, or Firm* — Wolf, Greenfield & Sacks, P.C.

(57) ABSTRACT

Described herein are redox flow batteries comprising a first aqueous electrolyte comprising a first type of redox active material and a second aqueous electrolyte comprising a second type of redox active material. The first type of redox active material may comprise one or more types of quinoxalines, or salts thereof. Methods for storing and releasing energy utilizing the described redox flow batteries are also provided.

22 Claims, 9 Drawing Sheets

Related U.S. Application Data

(60) Provisional application No. 61/940,997, filed on Feb. 18, 2014.

(51) Int. Cl.

*H01M 8/20* (2006.01)
  *H01M 4/58* (2010.01)
  *H01M 4/60* (2006.01)
  *H01M 8/0236* (2016.01)
  *H01M 8/0215* (2016.01)

(56) References Cited

U.S. PATENT DOCUMENTS

| | | |
|---|---|---|
| 2001/0028977 A1 | 10/2001 | Kazacos et al. |
| 2010/0055513 A1 | 3/2010 | Soloveichik |
| 2013/0004819 A1 | 1/2013 | Mun et al. |
| 2013/0045400 A1 | 2/2013 | Dong et al. |
| 2014/0004403 A1 | 1/2014 | Yan et al. |
| 2014/0028260 A1 | 1/2014 | Goeltz et al. |
| 2014/0370403 A1 | 12/2014 | Narayan et al. |

OTHER PUBLICATIONS

International Preliminary Report on Patentability dated Sep. 1, 2016 for Application No. PCT/US2015/016323.

Assary et al., Reduction potential predictions of some aromatic nitrogen-containing molecules. RSC Advances. Oct. 2014;4:57442-51.

Badel et al., An investigation of quinoxaline in redox flow battery applications. AIChE Annual Meeting. Salt Lake City, NV. Nov. 9, 2015. Abstract. 1 page.

Badel et al., An investigation of quinoxaline in redox flow battery applications. AIChE Annual Meeting. Salt Lake City, NV. Nov. 9, 2015. Poster. 1 page.

Doyle et al., Relationship between ionic conductivity of perfluorinated ionomeric membranes and nonaqueous solvent properties. J. Membr. Sci. Mar. 30, 2001;184(2):257-73.

Huskinson et al., A metal-free organic-inorganic aqueous flow battery. Nature. Jan. 9, 2014;505(7482):195-8. Doi: 10.1038/nature12909.

Huskinson et al., Novel Quinon-Based Couples for Flow Batteries. ECS Trans. May 2, 2013;53(7):101-5.

Koter et al., Comparative investigations of ion-exchange membranes. J. Membr. Sci. Feb. 3, 1999;153(1):83-90.

Lopez et al., Morphological Transitions on Lithium Metal Anodes. J. Electrochem. Soc. Jul. 2009;156(9):A726-9.

Lu et al., Aqueous cathode for next-generation alkali-ion batteries. J Am Chem Soc. Apr. 20, 2011;133(15):5756-9. doi: 10.1021/ja201118f.

Milshtein et al., Electrochemical Behavior of Quinoxaline in Aqueous Electrolytes. ECS Conference on Electrochemical Energy & Storage. Jul. 29, 2015. Abstract. 2 pages.

Milshtein et al., Electrochemical Behavior of Quinoxaline in Aqueous Electrolytes. ECS Conference on Electrochemical Energy & Storage. Jul. 29, 2015. Presentation. 18 pages.

Milshtein et al., Voltammetry study of quinoxaline in aqueous electrolytes. Electrochimica Acta. 2015;180:695-704.

Quan et al., Voltammetry of quinones in unbuffered aqueous solution: reassessing the roles of proton transfer and hydrogen bonding in the aqueous electrochemistry of quinones. J Am Chem Soc. Oct. 24, 2007;129(42):12847-56.

Rutter, Greener storage for green energy—ARPA-E grant will support research into next-generation flov batteries to solve wind/solar intermittency problem. Harvard School of Engineering and Applied Sciences. Nov. 28, 2012. Last accessed Mar. 7, 2017 from <http://www.seas.harvard.edu/news/2012/11/greener-storage-green-energy>. 4 pages.

Su et al., All-Organic Aqueous Redox Flow Batteries. MIT Energy Initiative. Poster. Feb. 19, 2014. 1 page.

Van Der Meer et al., Electrochemical reduction of aza aromatics. Part I. Polarographic reduction of aromatic di-aza compounds and correlation of results with H.M.O. calculations. Recl. Trav. Chim. Pays-Bas. 1968;87(7):746-54.

Wang et al., Li-Redox Flow Batteries Based on Hybrid Electrolytes: At the Cross Road between Li-ion and Redox Flow Batteries. Adv. Energy Mater. Jul. 2012;2(7):770-9.

Xu et al., A study of tiron in aqueous solutions for redox flow battery application. Electrochimica Acta. Jan. 1, 2010;55(3):715-20.

Yan et al., Electroactive Organic Compounds as Anode-Active Materials for Solar Rechargeable Redox Flow Battery in Dual-Phase Electrolytes. Journal of the Electrochemical Society. 2014;161(5)A736-41.

Yang et al., Electrochemical energy storage for green grid. Chem Rev. May 11, 2011;111(5):3577-613. doi: 10.1021/cr100290v.

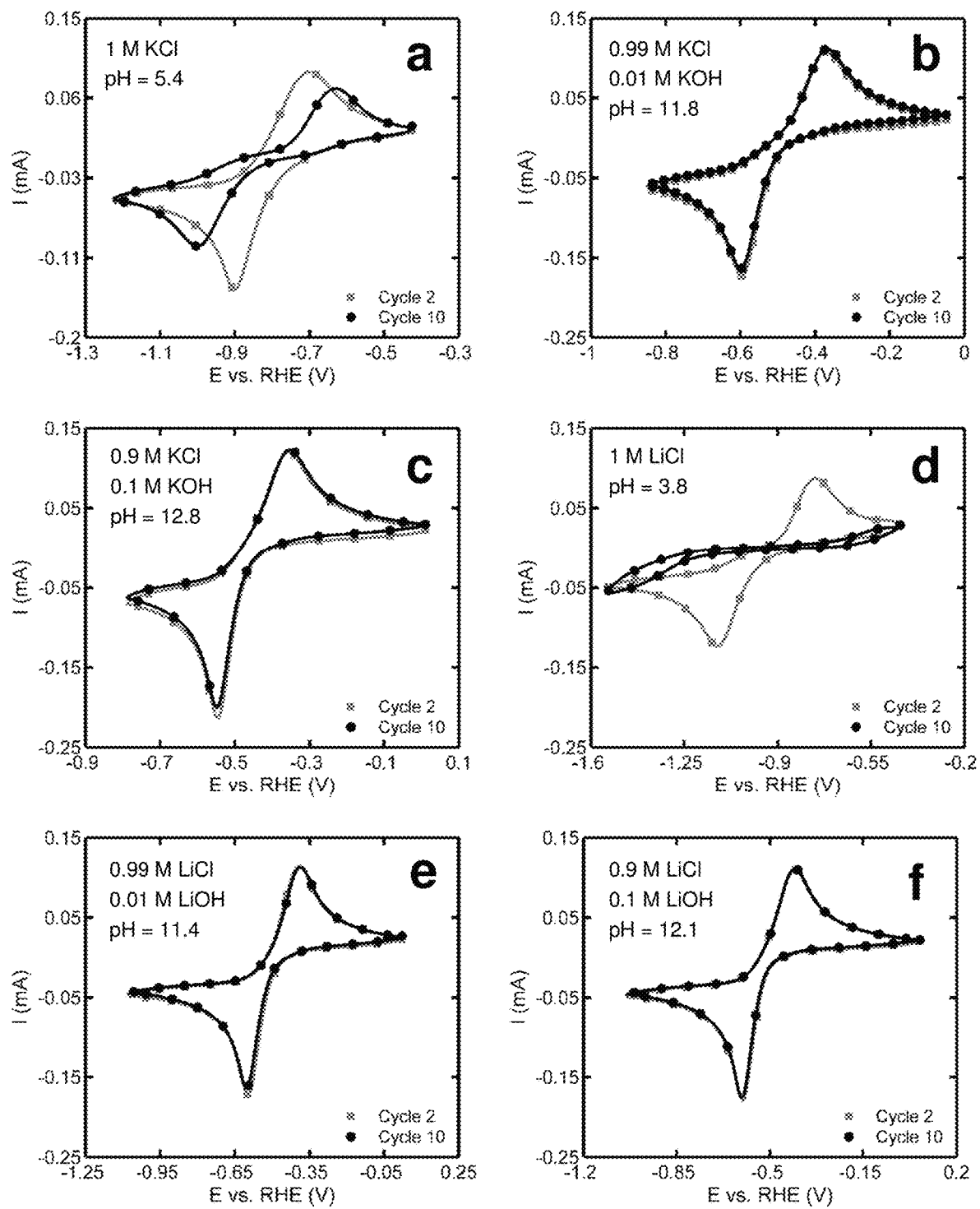
Figure 3a-f

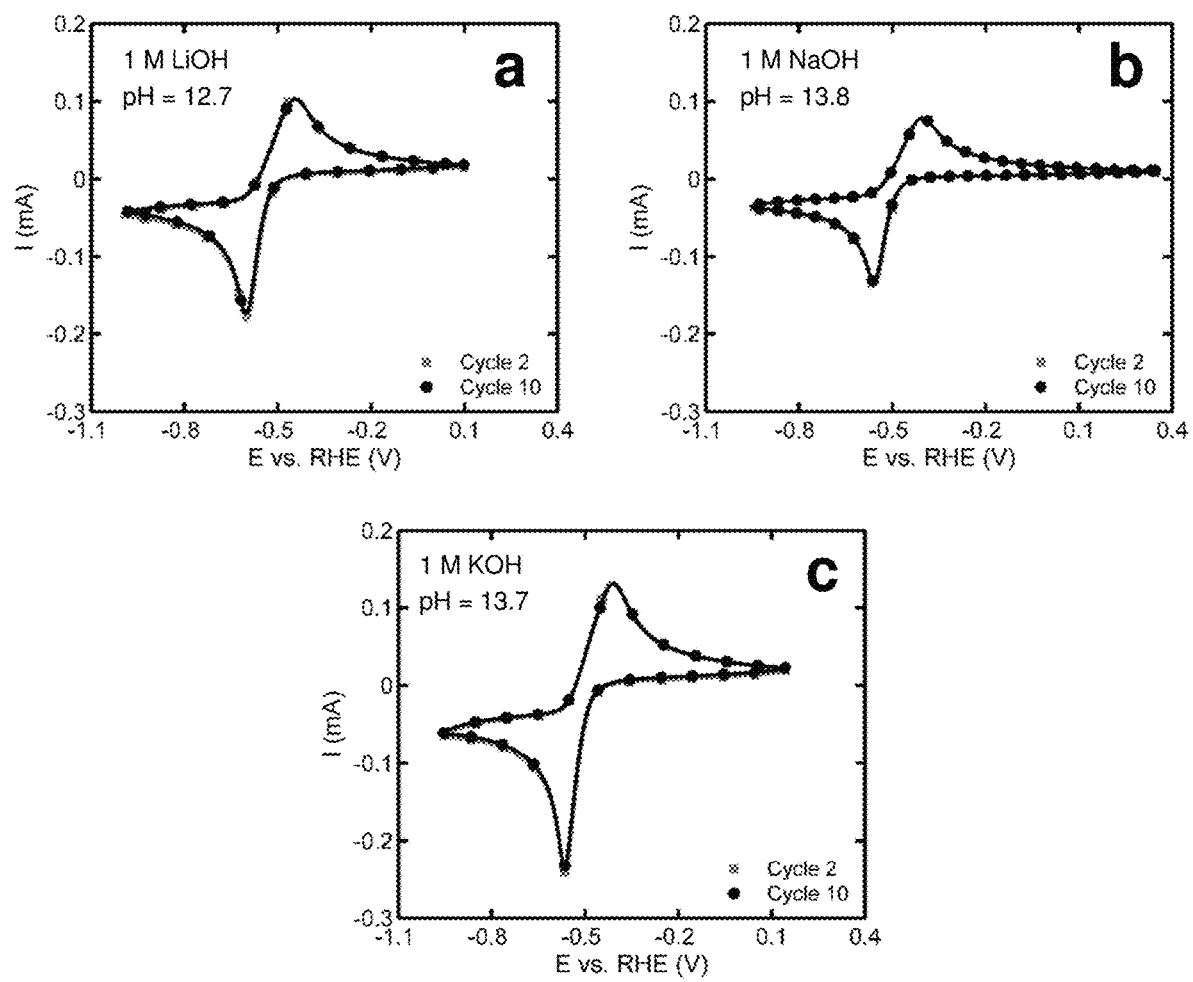
Figure 4a-c

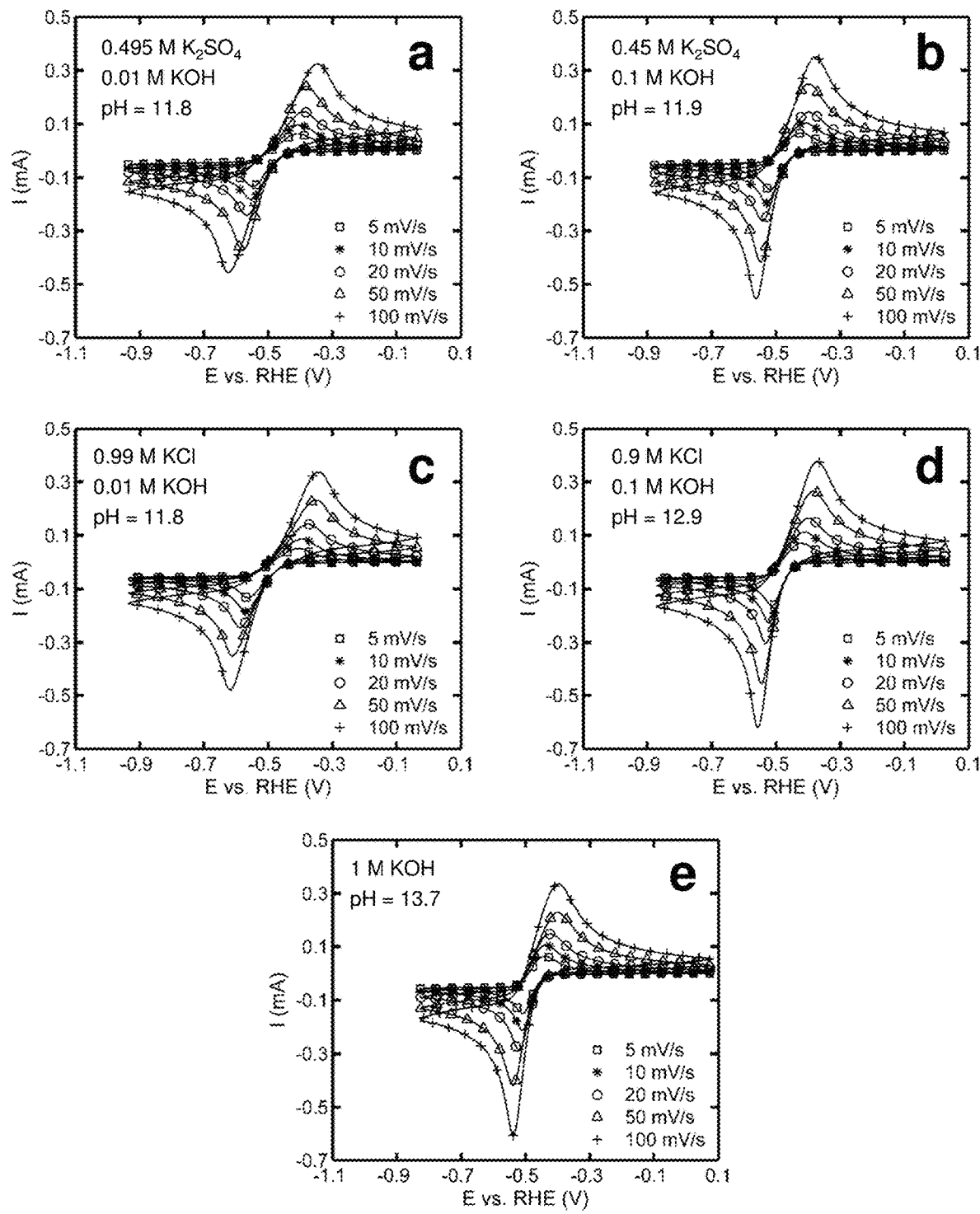
Figure 5a-e

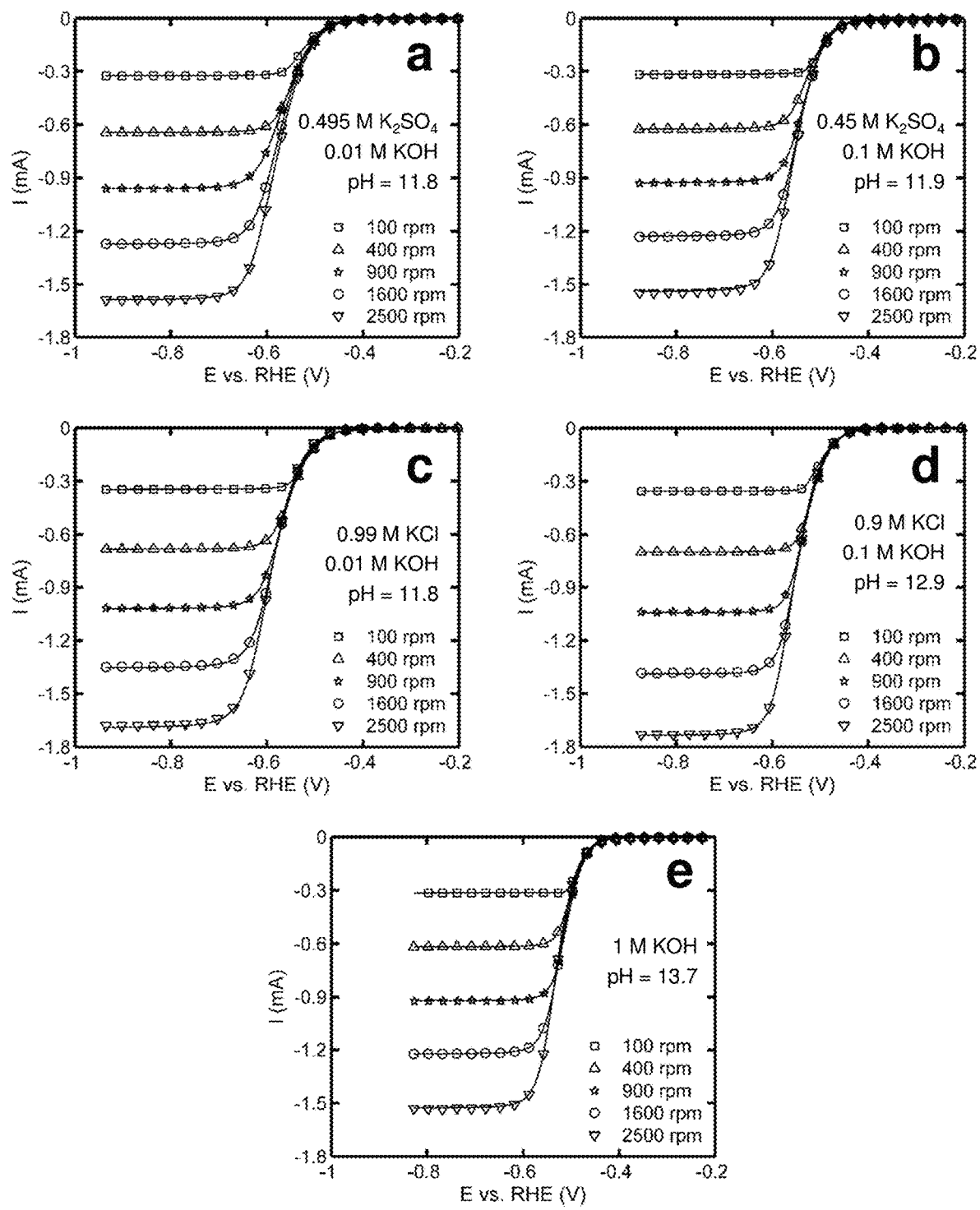
Figure 6a-e

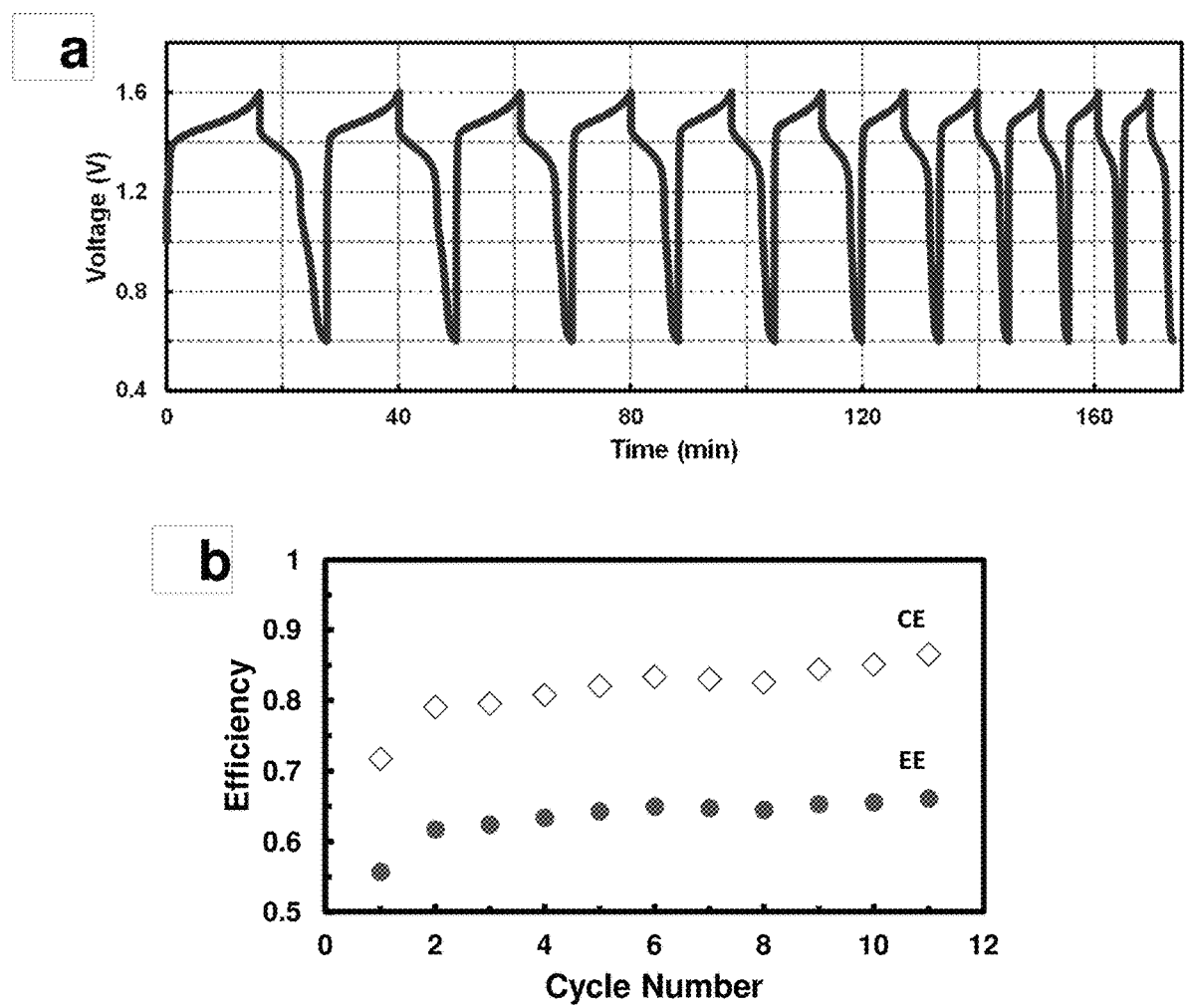
Figure 7a-b

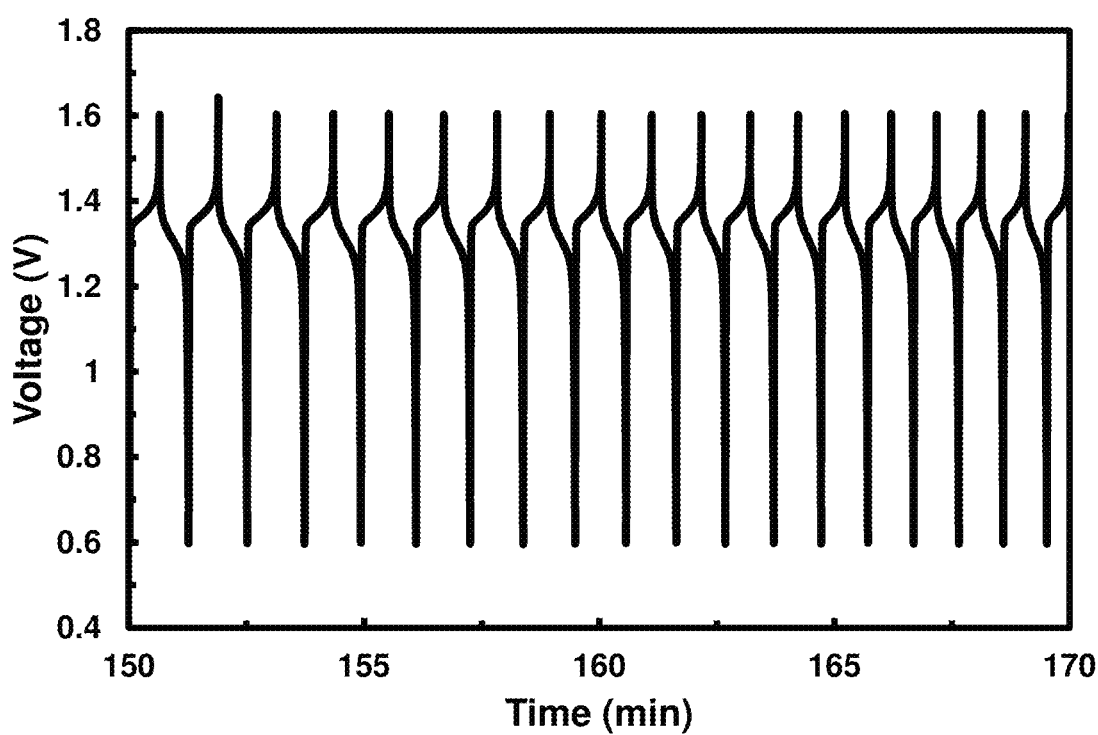
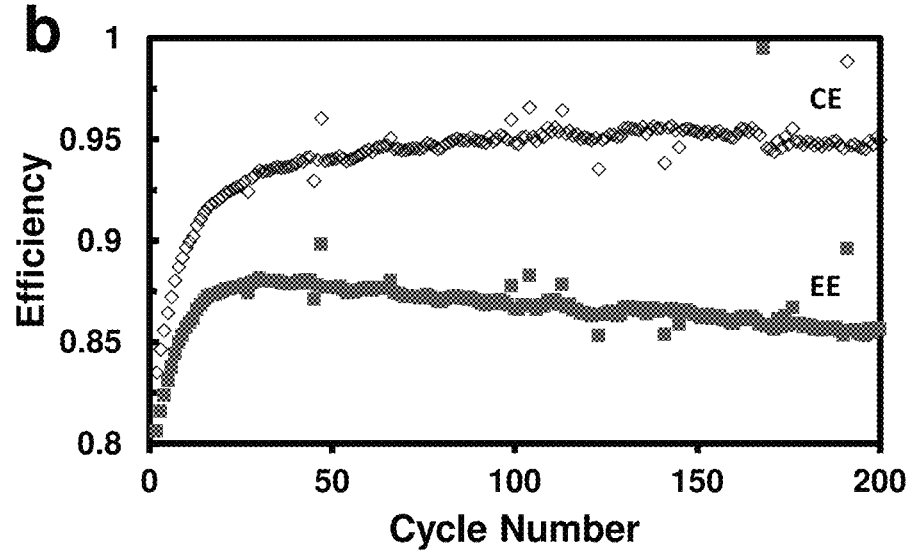
Figure 8a-b

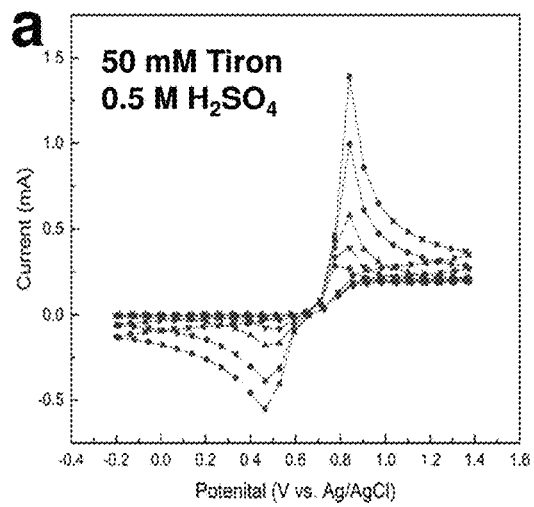
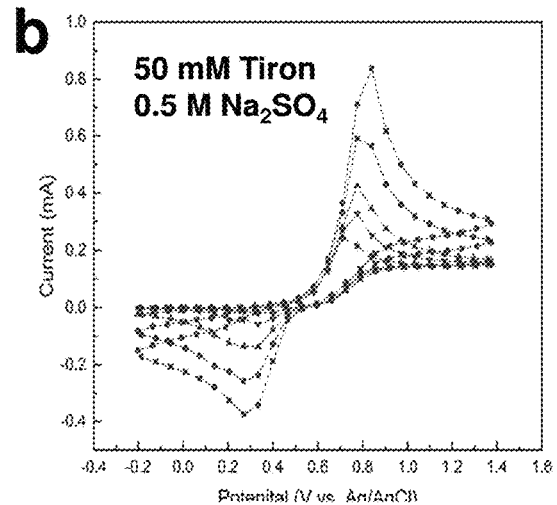
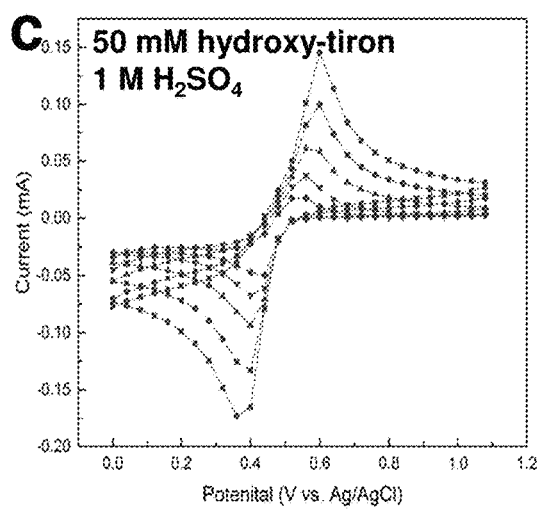
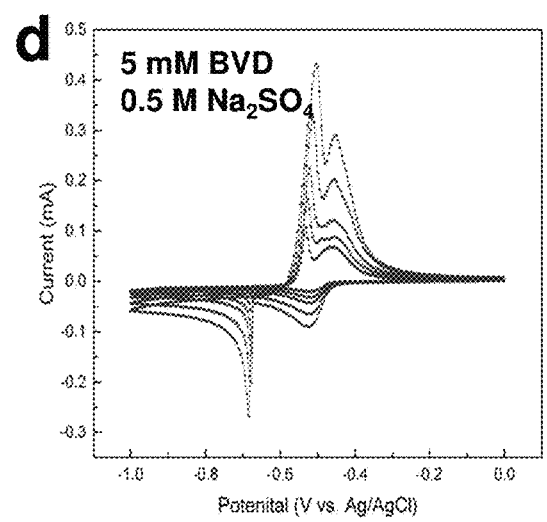
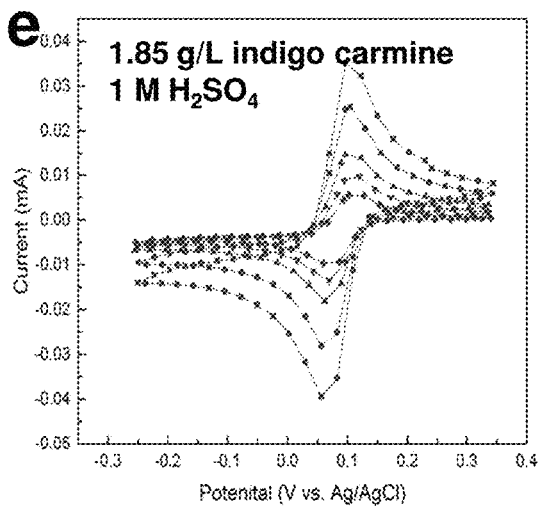
GCE/Pt/Ag/AgCl cell for all figures.
Scan rates (V/s) from top to bottom for all figures: 0.1, 0.05, 0.02, 0.01, 0.005
Figure 9a-e

MATERIALS FOR USE WITH AQUEOUS REDOX FLOW BATTERIES AND RELATED METHODS AND SYSTEMS

RELATED APPLICATIONS

This Application is a continuation of U.S. application Ser. No. 14/625,417, filed on Feb. 18, 2015, which is herein incorporated by reference in its entirety. application Ser. No. 14/625,417 claims priority under 35 U.S.C. § 119(e) to U.S. Provisional Application Ser. No. 61/940,997, filed on Feb. 18, 2014, which is herein incorporated by reference in its entirety.

FIELD OF THE INVENTION

Materials for use with aqueous redox flow batteries and related methods and systems are generally provided.

BACKGROUND

There is a growing need for large-scale energy storage systems that can support electrical transmission grids and enable the reliable implementation of intermittent renewable sources. Of particular interest are redox flow batteries, which are rechargeable electrochemical energy storage devices that utilize the oxidation and reduction of two soluble electroactive species for charging (storing energy) and discharging (releasing energy). The redox active species are stored in separate liquid reservoirs and pumped to and from the power converting device (e.g., electrochemical cell stack). This differs from conventional enclosed secondary batteries, such as lithium ion batteries, where, during cycling, the working ion shuttles between two solid electrode structures which contain the redox active materials. The energy capacity of a redox flow battery is generally independent of electrode or stack size, and can be scaled for a given electrolyte simply by changing the volume of the liquid electrolytes. The energy density of the electrolyte, and thus the overall system, generally depends on the concentration of the redox active species in the electrolyte and/or on the number of electrons each species can transfer during operation.

Known aqueous redox flow battery chemistries include: iron-chromium, bromine-polysulfide, vanadium-bromine, all vanadium, zinc-bromine, and soluble lead-acid. Commercialization of these technologies have been limited by characteristics inherent to the chemical systems, including: low energy density, low round-trip energy efficiencies, and high costs. For most systems the electrolytes themselves represent a significant fraction of overall cost. The low cost of water relative to other solvents or solid electrode designs make aqueous redox flow batteries an attractive option if combined with redox active materials that can offer complimentary advantages including high solubility, a high open-circuit voltage, long-term durability, and low material costs. Many existing aqueous flow batteries operate in acid or base, which require expensive materials of construction for piping, tanks, and electrochemical cell components. A battery that operates at milder conditions while maintaining similar energy density to more caustic systems may be advantageous for durability reasons alone.

The energy density of most aqueous flow batteries are limited by both the solubility of the redox active material, typically less than 2 M, and the number of electrons transferred, typically 1 per molecule. Most aqueous flow battery technologies are based on transition metal redox active species. These species primarily utilize a single electron transfer for the reactions at both the positive and negative electrode, which limits the theoretical charge concentration of an electrolyte to the species concentration. Many organic species are highly soluble in aqueous electrolytes and are capable of undergoing 2 electron transfer. If both the positive and negative species are soluble enough to enable a charge carrier concentration greater than 2 M, they could enable significantly higher energy density than the presently-employed aqueous flow batteries. Moreover, these organic species may be more easily-synthesized than the typical metal salts in terms of required energy input and environmental impact, and/or operation at mild pH may reduce costs on balance of plant materials, possibly replacing stainless steel with plastics. This would enable systems with smaller footprints and reduced material costs to achieve the same power output and energy storage capability. These flow batteries could be located almost anywhere in the transmission grid or in a distribution system and could significantly help stabilize the grid in critical or remote locations and relieve transmission congestion. Load leveling helps the environment by allowing a fossil fuel power plant to operate at its optimum efficiency level.

There is an ongoing need for new, more efficient, aqueous redox flow batteries. Accordingly, improved materials, systems, and methods are needed.

SUMMARY

The present disclosure provides a flow battery comprising a first aqueous electrolyte comprising a first type of redox active material, and a second aqueous electrolyte comprising a second type of redox active material, wherein the first type of redox active material comprises a quinoxaline moiety, or a salt or mixture thereof. In some embodiments, the quinoxaline moiety comprises a quinoxaline dimer, trimer, or tetramer. In some embodiments, the quinoxaline moiety comprises a polymer or dendrimer. In some embodiments, the quinoxaline moiety is associated with a metal center.

In some embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, wherein the first type of redox active material comprises a quinoxaline moiety, or a salt or mixture thereof.

In some embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, a separator between the first aqueous electrolyte and second aqueous electrolyte, wherein the first type of redox active material comprises a quinoxaline moiety, or a salt or mixture thereof.

In some embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, and a separator between the first aqueous electrolyte and second aqueous electrolyte, wherein the first redox active material comprises a quinoxaline moiety, or a salt or mixture thereof, and the first aqueous electrolyte has a pH between about 7 and about 10, between about 10 and about 12, or between about 7 and about 14.

In some embodiments, the flow battery comprises a first aqueous electrolyte comprising a first type of redox active material, a second aqueous electrolyte comprising a second type of redox active material, wherein the first type of redox active material comprises a quinoxaline moiety. In some embodiments, the quinoxaline moiety comprises a compound of Formula (I):

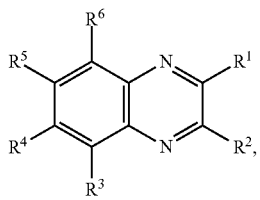

(I)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; wherein each R$^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group; and optionally, any two adjacent groups selected from $R^1$, $R^2$, $R^3$, $R^4$, $R^5$, and $R^6$ are joined to form an optionally substituted aryl or optionally substituted heteroaryl ring.

In some embodiments, a quinoxaline dimer comprises a compound of Formula (II):

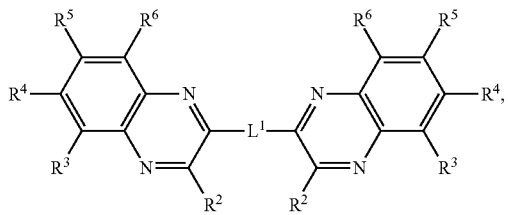

(II)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; and optionally the two R$^2$ groups are joined together to be L$^1$; and each L$^1$ is independently a direct bond, an optionally substituted alkyl chain, optionally substituted heteroalkyl chain, optionally substituted carbocyclyl ring, optionally substituted heterocyclyl ring, optionally substituted aryl ring, or optionally substituted heteroaryl ring.

In some embodiments, a quinoxaline trimer comprises a compound of Formula (III-A):

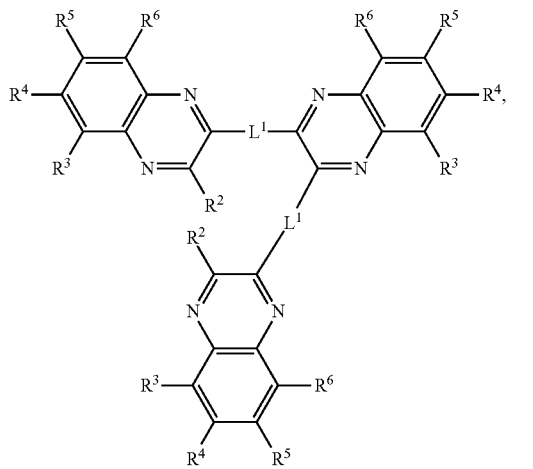

(III-A)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; and optionally the two R$^2$ groups are joined together to be L$^1$; and each L$^1$ is independently a direct bond, an optionally substituted alkyl chain, optionally substituted heteroalkyl chain, optionally substituted carbocyclyl ring, optionally substituted heterocyclyl ring, optionally substituted aryl ring, or optionally substituted heteroaryl ring.

In some embodiments, a quinoxaline trimer comprises a compound of Formula (III-B):

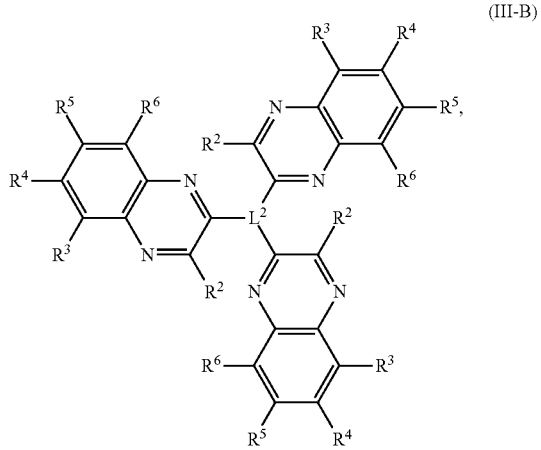

(III-B)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; L$^2$ is an optionally substituted alkyl chain, optionally substituted heteroalkyl chain, optionally substituted carbocyclyl ring, optionally substituted heterocyclyl ring, optionally substituted aryl ring, or optionally substituted heteroaryl ring, and optionally any two R$^2$ groups are joined to form a direct bond, an optionally substituted alkyl chain, optionally substituted heteroalkyl chain, optionally substituted carbocyclyl ring, optionally substituted heterocyclyl ring, optionally substituted arylene ring, or optionally substituted heteroaryl ring linker.

In some embodiments, the quinoxaline moiety may be associated with a metal center. In some embodiments, the quinoxaline moiety associated with a metal center comprises Formula (IV):

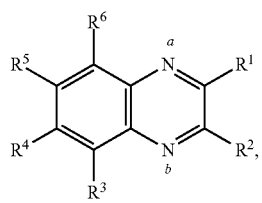

(IV)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; each $R^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group, provided at least one of the nitrogen labeled a, the nitrogen labeled b, $R^1$, $R^2$, $R^3$, $R^4$, $R^5$, and $R^6$ is associated with a metal center, and the metal center is optionally associated with auxiliary ligands.

In another aspect, the flow battery provided herein comprising a first type of redox active material comprising a quinoxaline moiety provides a method for storing or releasing energy. In certain embodiments, the method of storing energy comprises applying a potential difference across the first and second electrode of the flow battery, wherein the first redox active material is reduced. In certain embodiments, the method of storing energy comprises applying a potential difference across the first and second electrode of the flow battery, wherein one or more quinoxaline moieties of the first redox active material are reduced. In certain embodiments, the method of releasing energy comprises applying a potential difference across the first and second electrode of the flow battery, wherein the first redox active material is oxidized. In certain embodiments, the method of releasing energy comprises applying a potential difference across the first and second electrode of the flow battery, wherein the reduced forms of one or more quinoxaline moieties of the first active material are oxidized.

Other aspects and various non-limiting embodiments of the invention are described in the following detailed description. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments herein will be described by way of example with reference to the accompanying figures, which are schematic and are not intended to be drawn to scale. Unless indicated as representing the prior art, the figures represent aspects of certain embodiments. In the figures, each identical or nearly identical component illustrated is typically represented by a single numeral. For purposes of clarity, not every component is labeled in very figure, nor is every component of each embodiment shown where illustration is not necessary to allow those of ordinary skill in the art to understand the embodiments. In the figures:

FIGS. 3a-f, 4a-c, and 5a-e. Cyclic voltammograms of quinoxaline with varying supporting electrolytes and pH, according to some embodiments.

FIG. 6a-e. Rotating disk-electrode voltammograms of quinoxaline at varying rotation speeds in different electrolytes, according to some embodiments.

FIG. 7a-b. Voltage vs. time and efficiency vs. cycle number plots from cycling data of a 0.1 M tiron/0.1 M quinoxaline cell, according to some embodiments.

FIG. 8a-b. Voltage vs. time and efficiency vs. cycle number plots from cycling data of a 0.08 M K$_4$Fe(CN)$_6$/0.1 M quinoxaline cell, according to some embodiments.

FIGS. 9a-e. Cyclic voltammograms of various types of redox active materials, according to some embodiments.

DETAILED DESCRIPTION OF CERTAIN EMBODIMENTS

Figure 2:
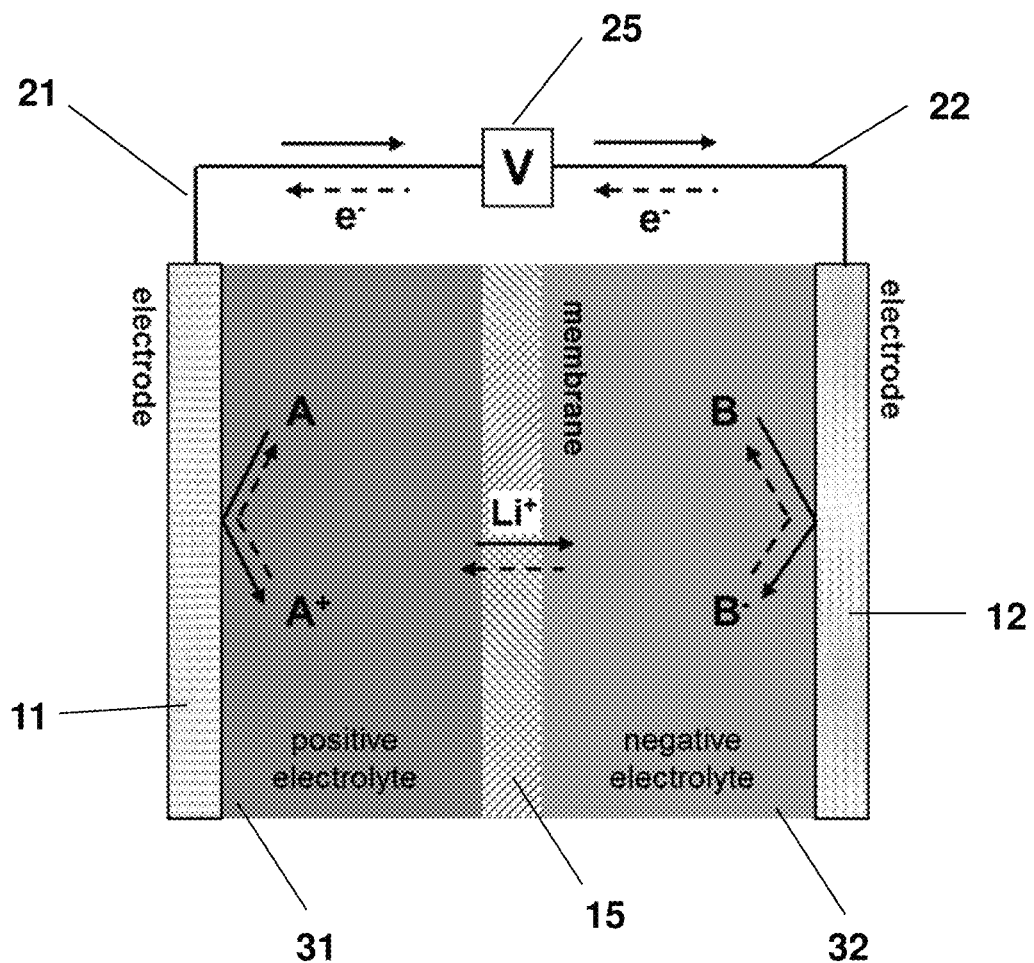
FIG. 2. Schematic of a non-limiting cell configuration showing two electrolyte/electrode chambers separated by a membrane, according to some embodiments.

Provided herein are materials for use in aqueous redox flow batteries, and related methods and systems. Given their compatibility with alkali-metal salts, flow battery systems based on organic redox species may be operated at mild pH values. At its simplest, a flow battery may be thought of as a rechargeable battery with a continuous flow of one reactant past its negative, or low potential, electrode and a continuous flow of another reactant past its positive, or high-potential, electrode. Sometimes the positive and negative electrolytes are referred to as the catholyte and the anolyte. The reactants are stored in separate tanks and pumped to and from a power-converting device, such as an electrochemical cell stack, when charging (absorbing excess electricity from the power source) or discharging (delivering electricity to the power source). This is shown in FIG. 2 for a positive and a negative electrolyte consisting of species A and B respectively where a cation (e.g., Li$^+$) exchanges between the electrolytes to balance electroneutrality. During charge the redox species A is oxidized (i.e., gives up an electron) to A$^+$ and redox species B is reduced (i.e., accepts an electron) to B$^-$. To balance the charge from this electron transfer, a cation (e.g., Li$^+$) is transported across the physical separator or cation-selective membrane. During discharge, when electricity is utilized from the flow battery, the current direction is reversed and redox species A and B are reformed.

The selection of aqueous electrolytes and active materials is generally based on their electrochemical properties (e.g., stability window), physical properties (e.g., viscosity, vapor properties), safety (e.g., corrosiveness, toxicity), and cost. Possible candidate electrolytes include acidic solutions (e.g., H$_2$SO$_4$, CH$_3$SO$_3$H), mild to neutral pH solutions containing alkali-ion salts (e.g., Li$_2$SO$_4$, KCl), or basic solutions (e.g., LiOH, KOH). The selection of redox active materials is based on their electrochemical properties (redox potential, reversibility, etc.), physical properties (solubility, etc.), safety, and cost. Possible active materials include organic molecules with unsaturated moieties and/or conjugated unsaturated moieties. These moieties can be aromatic, non-aromatic, or a combination thereof, and comprise carbon-carbon unsaturated bonds, carbon-heteroatom unsaturated bonds, or a combination of carbon-carbon and carbon-heteroatom unsaturated bonds, and wherein the heteroatom is a non-metallic heteroatom or a metalloid heteroatom. Additional candidates include organic chelating agents that incorporate titanium, manganese or iron, which are multivalent and naturally abundant. Non-limiting examples of redox active materials for the positive (high potential) electrode are hydroquinones/quinones (e.g., 1,2-dihydroxy-3,5-benzenedisulfonic acid disodium salt (Tiron), 1,2,4-trihydroxy-3,5-benzenedisulfonic acid disodium salt) and organic dyes (e.g., indigo carmine). Non-limiting examples of redox active materials for the negative (low potential) electrolyte includes quinoxaline derivatives (e.g., quinoxaline) and viologen derivatives (e.g., benzyl viologen dichloride).

The energy density of aqueous flow batteries can be limited by both the solubility of the redox-active material, typically less than 2 M, and the number of electrons transferred, typically 1 per molecule. In some embodiments, the organic species are highly soluble in aqueous electrolytes and/or are capable of undergoing two electron transfer.

Figure 1:
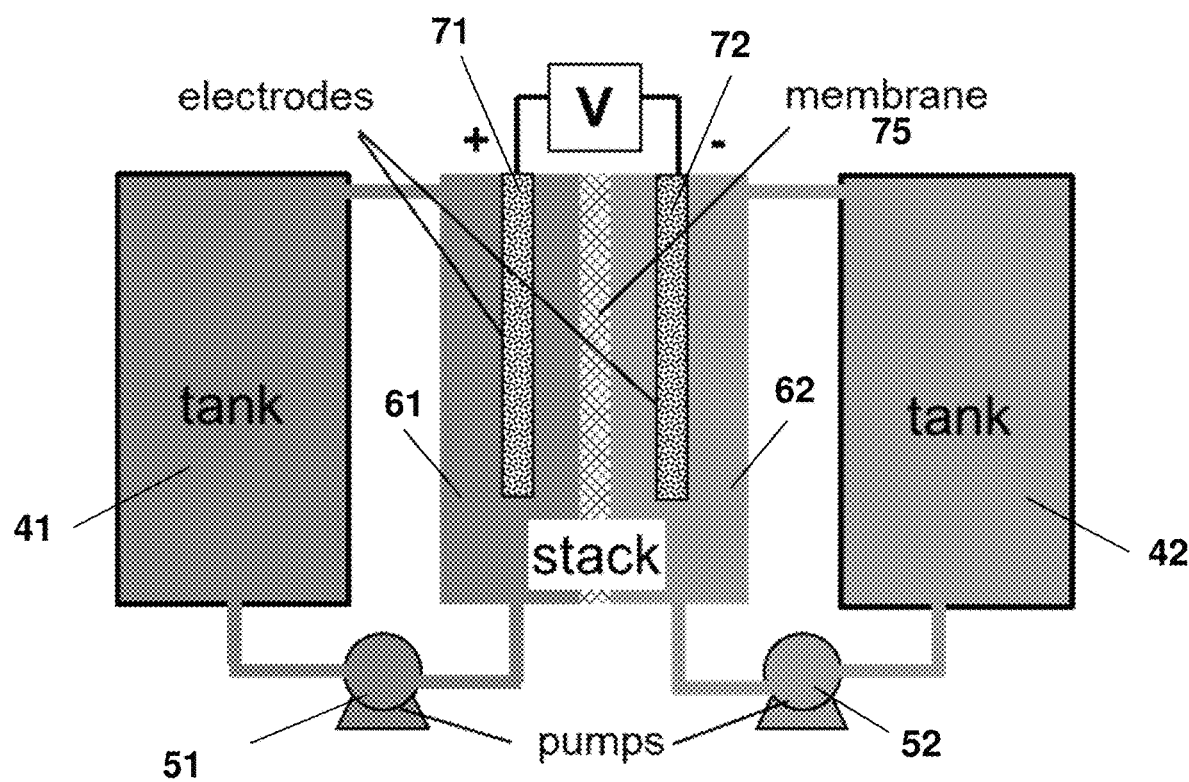
FIG. 1. Schematic of a non-limiting flow battery system featuring two fluid circulation loops, according to some embodiments.

Generally, redox flow batteries comprise redox active materials (e.g., electrolytes) and an energy conversion element (e.g., electrochemical cell stack). The electrolytes flow through the electrochemical stack. In certain embodiments, the electrolytes flow through a circulation pathways driven by pumps. FIG. 1 shows an exemplary system of a redox flow battery with two circulation paths, each comprising a tank, pump, piping, and one or more chambers within the electrochemical stack. The electrochemical stack may be comprised of one or more electrochemical cells. FIG. 2 shows an exemplary cell, wherein each electrolyte contacts either a positive or negative electrode and a separator divides the two electrolytes. In some embodiments, the separator is permeable to and/or conductive to ions. FIGS. 1 and 2 are described in more detail herein. One advantage of a redox flow battery is the decoupling of power and energy. The energy capacity of such a system can be changed without changing the system power. For example, increasing the volume of electrolyte can add energy capacity without requiring any change to the electrochemical stack. To increase the energy capacity of a typical sealed battery (e.g., lithium ion) the size of the electrochemical stack must be increased.

In certain embodiments, a flow battery comprises a first aqueous electrolyte comprising a first type of redox active material. In certain embodiments, the flow battery comprises a first and second aqueous electrolyte comprising a first type and a second type of redox active material, respectively. The first type of redox active material and the second type of redox active material may be the same or different. The battery may, in some embodiments, further comprise a first electrode in contact with the first electrolyte and/or a second electrode in contact with the second electrolyte. In certain embodiments, the battery may further comprise a separator between the first and second electrolyte. The separator may prevent or impede the mixing of the first and second electrolyte, may serve as an insulator between the electrolytes or the electrodes, or both, and/or may provide a pathway for ion transport between the electrolytes. The transport of ions between the electrolytes aids in balancing the transport of electrons between the electrolytes. The electrons are primarily transported to and from an electrolyte through the electrode contacting that electrolyte.

As used herein, the term "aqueous electrolyte" is given its ordinary meaning in the art and refers to an aqueous solution in which at least one kind of such a substance is dissolved. In some cases, the aqueous electrolyte is a solvent, wherein solvent comprises at least about 50% water, at least about 75% weight water, at least about 80% weight water, at least about 85% weight water, at least 90% weight water, at least 95% weight water, based on the total weight of the solvent. For the purpose of this calculation, any co-solvents are included in the weight of the solvent but any type of redox active material, buffer, or other supporting electrolyte is not considered a solvent, even if such species is a liquid. When a co-solvent is present, the co-solvent may be soluble, miscible, or partially miscible with water.

The term "active material" or "redox active material" is given its ordinary meaning in the art and refers to materials which undergo a change in oxidation state during operation of an electrochemical system, such as a flow battery. In certain embodiments, types of active materials comprise species dissolved in a liquid electrolyte. A type of redox active material may comprise a single species or may comprise multiple species.

A redox flow battery may be both charged and discharged. In certain embodiments, during charge, the first type of redox active material contained in the first electrolyte undergoes reduction, and the second type of redox active material present in the second electrolyte undergoes oxidation, whereas during discharge, the first type of redox active material present in the first electrolyte undergoes oxidation, and the second type of redox active material present in the second electrolyte undergoes reduction. In certain other embodiments the roles of the electrolytes are reversed, such that during charge the first type of redox active material present in the first electrolyte undergoes oxidation, and the second type of redox active material present in the second electrolyte undergoes reduction, whereas during discharge, the first type of redox active material present in the first electrolyte undergoes reduction, and the second type of redox active material present in the second electrolyte undergoes oxidation.

Each type of redox active material may have one or more redox potentials. In certain embodiments, the redox potentials of the first type of redox active material and second type of redox active material may be the same or different. When the potentials are different the type of redox active material with the higher potential is the "positive redox active material", and the corresponding electrolyte and electrode may be referred to as the "positive electrolyte" and "positive electrode". Likewise, the type of redox active material with the lower potential is the "negative redox active material", and the corresponding electrolyte and electrode may be referred to as the "negative electrolyte" and "negative electrode". During charge the positive redox active material present in the positive electrolyte undergoes oxidation, and the negative redox active material present in the negative electrolyte undergoes reduction, whereas during discharge, the positive redox active material present in the positive electrolyte undergoes reduction, and the negative redox active material present in the negative electrolyte undergoes oxidation. In certain embodiments, the first electrolyte is the positive electrolyte and the second electrolyte is the negative electrolyte. In certain other embodiments, the first electrolyte is the negative electrolyte and the second electrolyte is the positive electrolyte.

In certain embodiments, the flow battery comprises a first aqueous electrolyte comprising a first type of redox active material, and a second aqueous electrolyte comprising a second type of redox active material, wherein the first type of redox active material comprises a quinoxaline moiety, or a salt or mixture thereof. In some embodiments, the quinoxaline moiety comprises a quinoxaline dimer, trimer, or tetramer. In some embodiments, the quinoxaline moiety comprises a polymer or dendrimer. In some embodiments, the quinoxaline moiety is associated with a metal center.

In certain embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, wherein the first type of redox active material comprises a quinoxaline moiety, or a salt or mixture thereof.

In certain embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, a separator between the first aqueous electrolyte and second aqueous electrolyte, wherein the first type of redox active material comprises a quinoxaline moiety, or a salt or mixture thereof.

In certain embodiments, the flow battery comprises a first aqueous electrolyte comprising a first type of redox active material, a second aqueous electrolyte comprising a second type of redox active material, a first electrode in contact with the first aqueous electrolyte, a second electrode in contact with the second aqueous electrolyte, and a separator between the first aqueous electrolyte and second aqueous electrolyte, wherein the first redox active material comprises a quinoxaline moiety, or a salt or mixture thereof, and the first aqueous electrolyte has a pH between about 7 and about 10, between about 10 and about 12, or between about 7 and about 14.

In some embodiments, the first type of redox active species comprises a quinoxaline moiety. The term "quinoxaline moiety" as used herein refers to any species comprising at least one quinoxaline group. A "quinoxaline group" as used herein contains two fused 6 membered rings with the formula $C_8N_2$ in the following arrangement:

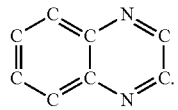

One example of a quinoxaline moiety is the molecule quinoxaline, itself, having the structure:

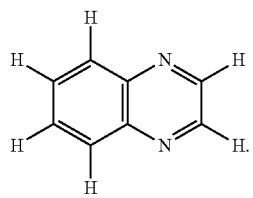

The quinoxaline moiety may comprise a single quinoxaline group or multiple quinoxaline groups. In the quinoxaline moiety there may be additional rings fused to the quinoxaline group. The quinoxaline moiety may comprise an oligomer, polymer, or dendrimer comprising one or more quinoxaline groups. In certain embodiments, the quinoxaline moiety comprises a compound of Formula (I) as described herein. In certain embodiments, the quinoxaline moiety comprises a quinoxaline dimer, trimer, or tetramer, for example, see Formula (II) and Formula (III) as described herein. In certain embodiments, the quinoxaline moiety comprises a polymer or dendrimer. In certain embodiments, the quinoxaline moiety is associated with a metal center, for example, see Formula (IV) as described herein. The quinoxaline moiety may comprise one or more quinoxaline groups one or more of which is associated with a metal center, as described herein. The quinoxaline moiety may be a neutral species or a charged species associated with one or more counter ions.

The first type of redox active material may comprise one or more types of quinoxaline moieties (e.g., one type, two types, three types, four types). An example of a redox active material comprising one type of quinoxaline moiety is a redox active material comprising the molecule quinoxaline. An example of a redox active material comprising more two types of quinoxaline moieties is a redox active material comprising a mixture of the molecule quinoxaline and 2-methylquinoxaline. The first type of redox active material may comprise one or more compounds of Formula (I) as described herein. The first type of redox active material may comprise one or more compounds of Formula (I) and one or more additional quinoxaline moieties. The first type of redox active material may comprise additional types of redox active compounds which do not comprise quinoxaline moieties. The second type of redox active material may comprise one or more quinoxaline moieties, one or more types of redox active compounds which are not quinoxaline moieties, or may comprise both one or quinoxaline moieties and one or more types of redox active compounds which are not quinoxaline moieties.

In certain embodiments, the flow battery comprises a first aqueous electrolyte comprising a first type of redox active material, a second aqueous electrolyte comprising a second type of redox active material, wherein the first type of redox active material comprises a quinoxaline moiety. In some embodiments, the quinoxaline moiety comprises a compound of Formula (I):

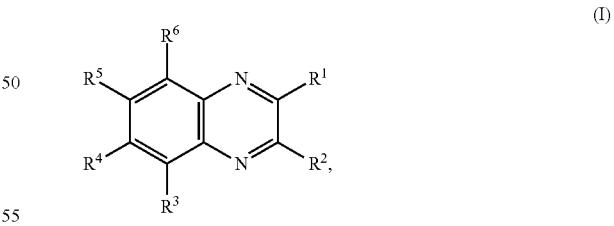

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; wherein each R$^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group; and optionally, any two adjacent groups selected from $R^1$, $R^2$, $R^3$, $R^4$, $R^5$, and $R^6$ are joined to form an optionally substituted aryl or optionally substituted heteroaryl ring.

In certain embodiments, a compound of Formula (I) comprises Formula (I-A):

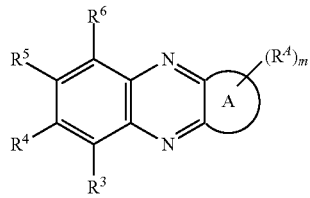

(I-A)

or a salt thereof, wherein $R^3$, $R^4$, $R^5$, and $R^6$ are as defined for compounds of Formula (I), Ring A is a monocyclic or bicyclic aryl ring or a 5-12 membered monocyclic or bicyclic heteroaryl ring, each $R^Z$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; wherein each $R^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group; and m is 0, 1, 2, 3, 4, 5, or 6. In some embodiments, m is 1 or 2. In some embodiments, m is 0. In certain embodiments the compound of Formula (I-A) comprises a compound of formula:

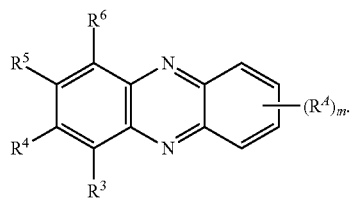

In some embodiments, the quinoxaline moiety comprises a quinoxaline dimer, trimer, tetramer, or the like. A "quinoxaline dimer" as used herein refers to a quinoxaline moiety comprising two quinoxaline groups. A "quinoxaline trimer" as used herein refers to a quinoxaline moiety comprising three quinoxaline groups. A "quinoxaline tetramer" as used herein refers to a quinoxaline moiety comprising four quinoxaline groups. The multiple quinoxaline groups may share common atoms (e.g., sharing carbon atoms as fused rings), be directly bonded, or be separated by one or more other atoms.

In some embodiments, a quinoxaline dimer comprises a compound of Formula (II):

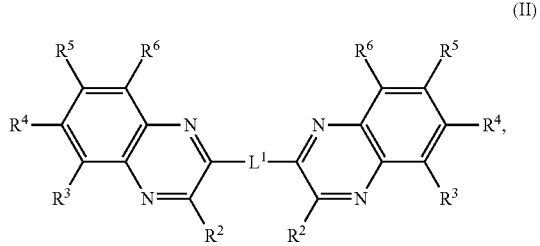

(II)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; and optionally the two $R^2$ groups are joined together to be $L^1$; and each $L^1$ is independently a direct bond, an optionally substituted alkyl chain, optionally substituted heteroalkyl chain, optionally substituted carbocyclyl ring, optionally substituted heterocyclyl ring, optionally substituted aryl ring, or optionally substituted heteroaryl ring.

In some embodiments, a quinoxaline trimer comprises a compound of Formula (III-A):

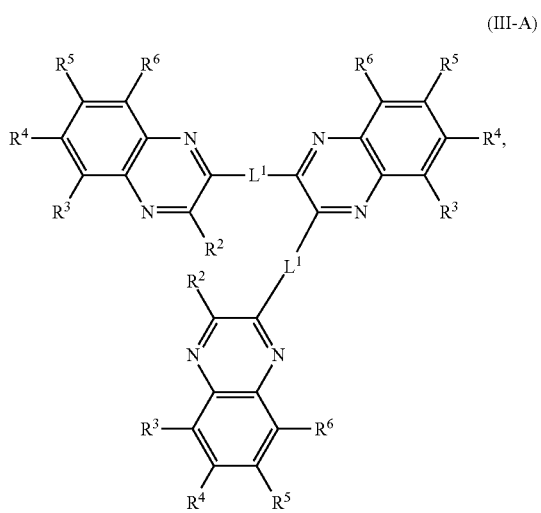

(III-A)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; and optionally the two $R^2$ groups are joined together to be $L^1$; and each $L^1$ is independently a direct bond, an optionally substituted alkyl chain, optionally substituted heteroalkyl chain, optionally substituted carbocyclyl ring, optionally substituted heterocyclyl ring, optionally substituted aryl ring, or optionally substituted heteroaryl ring.

In some embodiments, a quinoxaline trimer comprises a compound of Formula (III-B):

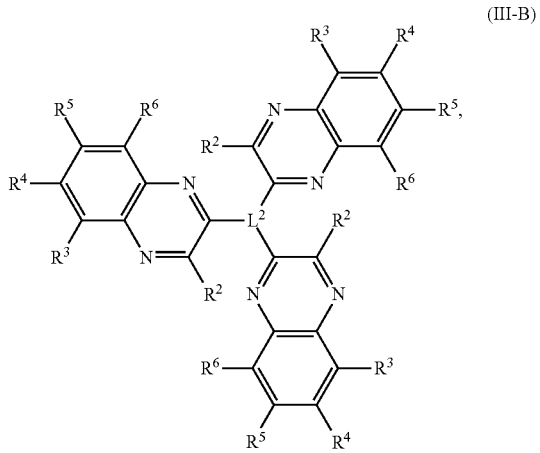

(III-B)

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; $L^2$ is an optionally substituted alkyl chain, optionally substituted heteroalkyl chain, optionally substituted carbocyclyl ring, optionally substituted heterocyclyl ring, optionally substituted aryl ring, or optionally substituted heteroaryl ring, and optionally any two $R^2$ groups are joined to form a direct bond, an optionally substituted alkyl chain, optionally substituted heteroalkyl chain, optionally substituted carbocyclyl ring, optionally substituted heterocyclyl ring, optionally substituted arylene ring, or optionally substituted heteroaryl ring linker.

The quinoxaline moiety may comprise a quinoxaline polymer or dendrimer. A quinoxaline polymer refers to a polymer comprising at least one, but typically multiple, quinoxaline groups. In some embodiments the quinoxaline polymer is comprised of a single type of monomer, each of which comprises a quinoxaline group. In some embodiments, the quinoxaline polymer comprises a co-polymer comprising both monomers comprising a quinoxaline group or one monomer not comprising a quinoxaline group. A quinoxaline dendrimer refers to a dendrimer comprising at least one, but typically multiple, quinoxaline groups. In some embodiments, the quinoxaline dendrimer comprises a first, second third, fourth generation dendrimer.

In some embodiments, the quinoxaline moiety may be associated with a metal center. In some embodiments, the quinoxaline moiety associated with a metal center comprises Formula (IV):

(IV)

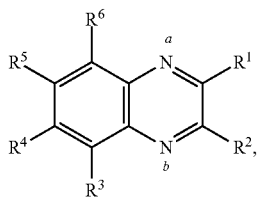

or a salt thereof, wherein each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$; each R$^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group, provided at least one of the nitrogen labeled a, the nitrogen labeled b, $R^1$, $R^2$, $R^3$, $R^4$, $R^5$, and $R^6$ is associated with a metal center, and the metal center is optionally associated with auxiliary ligands. In some embodiments, one of the nitrogen labeled a, the nitrogen labeled b, $R^1$, $R^2$, $R^3$, $R^4$, $R^5$, and $R^6$ is associated with the metal center. In some embodiments, two of the nitrogen labeled a, the nitrogen labeled b, $R^1$, $R^2$, $R^3$, $R^4$, $R^5$, and $R^6$ are associated with the metal center. In some embodiments, the nitrogen labeled a and $R^1$ are associated with the metal center. In some embodiments, the nitrogen labeled a and $R^6$ are associated with the metal center. In some embodiments, the nitrogen labeled a, $R^6$, and $R^3$ are associated with the metal center. In some embodiments, the nitrogen labeled $R^1$ and $R^2$ are associated with the metal center. In some embodiments, the nitrogen labeled $R^3$ and $R^4$ are associated with the metal center. In some embodiments, the nitrogen labeled $R^4$ and $R^5$ are associated with the metal center.

In some embodiments, the quinoxaline moiety of Formula (IV) comprises Formula (IV-A):

(IV-A)

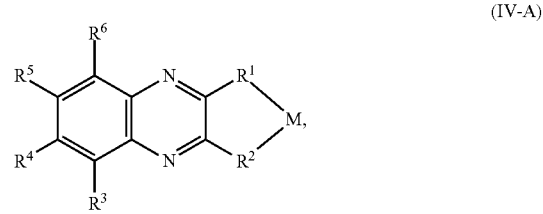

or a salt thereof, wherein $R^1$, $R^2$, $R^3$, $R^4$, $R^5$, and $R^6$ are as defined for compounds of Formula (IV), M is a metal center, and the metal center is optionally associated with auxiliary ligands.

In some embodiments, the quinoxaline moiety of Formula (IV) comprises Formula (IV-B):

(IV-B)

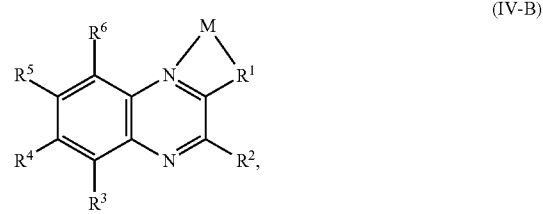

or a salt thereof, wherein $R^1$, $R^2$, $R^3$, $R^4$, $R^5$, and $R^6$ are as defined for compounds of Formula (IV), M is a metal center, and the metal center is optionally associated with additional ligands.

In some embodiments, the quinoxaline moiety of Formula (IV) comprises Formula (IV-C):

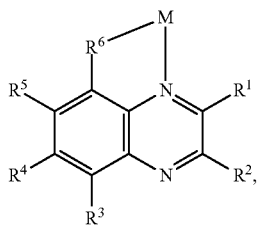

(IV-C)

or a salt thereof, wherein $R^1$, $R^2$, $R^3$, $R^4$, $R^5$, and $R^6$ are as defined for compounds of Formula (IV), M is a metal center, and the metal center is optionally associated with auxiliary ligands.

In certain embodiments, for a compound of Formula (IV), (IV-A), (IV-B), or (IV-C), the metal center is an alkali metal. In some embodiments, the alkali metal is Li, Na, or K. In certain embodiments, for a compound of Formula (IV), (IV-A), (IV-B), or (IV-C), the metal center is an alkaline earth metal. In some embodiments, the alkaline earth metal is Mg or Ca. In certain embodiments, for a compound of Formula (IV), (IV-A), (IV-B), or (IV-C), the metal center is a transition metal. In some embodiments, the transition metal is Ti, V, Cr, Mn, Fe, Co, Ni, Cu, or Zn. In certain embodiments, for a compound of Formula (IV), (IV-A), (IV-B), or (IV-C), the metal is Al, Sn, or Pb.

The metal center may be associated with one or more auxiliary ligands. Ligands are usually electron donors, and the central atom or ion is electron acceptors. The bonding between the central atom or ion and the ligand typically involves formal donation of one or more of the ligand's electron pairs. The nature of such bonding can range from covalent to ionic, and the bond order can range from one to three. One central atom or ion may bind to one or more ligands of the same or different type. A ligand may be capable of binding a central atom or ion through multiple sites, usually because the ligand includes lone pairs on more than one atom of the ligand. Those of ordinary skill in the art will be aware of auxiliary ligands, including, but not limited to, halides (e.g., chlorine, fluorine, bromine, iodine), sulfates, sulphites, carbonates, phosphates, phosphites, coordinating solvents (e.g., pyridine, tetrahydrofuran, diethyl ether, indoles and derivatives, imidazole, and derivatives etc.). The metal center may be charged. The auxiliary ligand(s) may or might not be charged. Exemplary ligands include charge-neutral ligands ("ligand molecules," e.g., $CH_3CN$, amides (e.g., N,N-dimethylformamide (DMF), N,N-dimethylacetamide (DMA), or N-methyl-2-pyrrolidone (NMP)), dimethyl sulfoxide (DMSO), amines (e.g., ammonia; ethylenediamine (en); pyridine (py); 2,2'-bipyridine (bipy); and 1,10-phenanthroline (phen)), phosphines (e.g., $PPh_3$), ethers (e.g., tetrahydrofuran (THF), 2-methly-tetrahydrofuran, tetrahydropyran, dioxane, diethyl ether, methyl t-butyl ether (MTBE), dimethoxyethane (DME), and diglyme), ketones (e.g., acetone and butanone), chlorohydrocarbons (e.g., dichloromethane (DCM), chloroform, carbon tetrachloride, and 1,2-dichloroethane (DCE)), esters (e.g., propylene carbonate and ethyl acetate), CO, $N_2$, water, and alkenes) and anionic ligands ("ligand ions," e.g., halides, hydride, alkyls, $S_2^-$, $S{-}CN^-$, $O{-}NO_2^-$, $N{-}N_2^-$, $O{-}H^-$, $[O{-}C({=}O){-}C({=}O){-}O]_2^-$, $N{=}C{=}S^-$, $CN^-$).

In certain embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen, halogen, optionally substituted alkyl, optionally substituted haloalkyl, —CN, —$NO_2$, —$OR^a$, —$N(R^a)_2$, —C(=O)$R^a$, —C(=O)$OR^a$, or —S(=O)$_2OR^a$; wherein each $R^a$ is independently hydrogen or optionally substituted alkyl. In certain embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen, halogen, optionally substituted $C_{1-6}$ alkyl, optionally substituted $C_{1-6}$ haloalkyl, —CN, —$NO_2$, —$OR^a$, —$N(R^a)_2$, —C(=O)$OR^a$, or —S(=O)$_2OR^a$; wherein each $R^a$ is hydrogen or optionally substituted $C_{1-6}$ alkyl. In certain embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen, halogen, $C_{1-6}$ alkyl, $C_{1-6}$ haloalkyl, —CN, —$NO_2$, —$OR^a$, —$N(R^a)_2$, —C(=O)$R^a$, or —S(=O)$_2OR^a$; wherein each $R^a$ is hydrogen or $C_{1-6}$ alkyl. In certain embodiments, for a compound of Formula (I), (I-A), (II), (III-A), (III-B), (IV), (IV-A), (IV-B), or (IV-C), each when present $R^1$, $R^2$, $R^3$, $R^4$, $R^5$, and $R^6$ is independently hydrogen, —F, —Cl, —Br, —I, methyl, ethyl, propyl, butyl, —$CF_3$, —CN, —$NO_2$, —OH, —OMe, —$NH_2$, —NHMe, —$NMe_2$, —C(=O)OH, —C(=O)OMe, —C(=O)OEt, —C(=O)OiPr, —C(=O)OtBu, —S(=O)$_2$OH, —S(=O)$_2$OMe, —S(=O)$_2$OEt, —S(=O)$_2$OiPr, or —S(=O)$_2$OtBu. In certain embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen, —F, —Cl, —Br, methyl, ethyl, —CN, —$NO_2$, —OH, —OMe, —$NH_2$, or —$NMe_2$, —C(=O)OH, —C(=O)OMe, —S(=O)$_2$OH, or —S(=O)$_2$ OMe. In certain embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen, —F, —Cl, —Br, or methyl. In some embodiments, for a compound of Formula (I), (I-A), (II), (III-A), (III-B), (IV), (IV-A), (IV-B), or (IV-C), when present each $R^1$, $R^2$, $R^3$, $R^4$, $R^5$, and $R^6$ is independently hydrogen. In some embodiments, for a compound of Formula (I), (I-A), (II), (III-A), (III-B), (IV), (IV-A), (IV-B), or (IV-C), at least one of $R^1$, $R^2$, $R^3$, $R^4$, $R^5$, and $R^6$ is optionally substituted alkyl and the remainder are hydrogen. In some embodiments, for a compound of Formula (I), (I-A), (II), (III-A), (III-B), (IV), (IV-A), (IV-B), or (IV-C), one of $R^1$, $R^2$, $R^3$, $R^4$, $R^5$, and $R^6$ is optionally substituted alkyl and the remainder are hydrogen. In some embodiments, $R^1$ is optionally substituted alkyl and the remainder are hydrogen. In certain embodiments, for a compound of Formula (I), (I-A), (II), (III-A), (III-B), (IV), (IV-A), (IV-B), or (IV-C), two of $R^1$, $R^2$, $R^3$, $R^4$, $R^5$, and $R^6$ are optionally substituted alkyl and the remainder are hydrogen. In some embodiments, $R^1$ and $R^2$ are optionally substituted alkyl and the remainder are hydrogen.

In certain embodiments, for a compound of Formula (I), (IV), (IV-A), (IV-B), or (IV-C), when present, $R^1$ and $R^2$ are joined to form an optionally substituted aryl or heteroaryl ring. In certain embodiments, for a compound of Formula (I), (IV), (IV-A), (IV-B), or (IV-C), $R^3$ and $R^4$ are joined to form an optionally substituted aryl or heteroaryl ring. In certain embodiments, for a compound of Formula (I), (IV), (IV-A), (IV-B), or (IV-C), $R^4$ and $R^5$ are joined to form an optionally substituted aryl or heteroaryl ring. In certain embodiments, for a compound of Formula (I), (IV), (IV-A), (IV-B), or (IV-C), $R^5$ and $R^6$ are joined to form an optionally substituted aryl or heteroaryl ring. In certain embodiments, for a compound of Formula (I), (IV-A), (IV-B), or (IV-C), $R^1$ and $R^2$ are joined to form an optionally substituted aryl or heteroaryl ring, and $R^3$ and $R^4$ are joined to form an optionally substituted aryl or heteroaryl ring. In certain embodiments, for a compound of Formula (I), (IV), (IV-A), (IV-B), or (IV-C), $R^1$ and $R^2$ are joined to form an optionally substituted aryl or heteroaryl ring, and $R^4$ and $R^5$ are joined to form an optionally substituted aryl or heteroaryl ring. In certain embodiments, for a compound of Formula (I), (IV), (IV-A), (IV-B), or (IV-C), $R^1$ and $R^2$ are joined to form an optionally substituted aryl or heteroaryl ring, and $R^5$ and $R^6$ are joined to form an optionally substituted aryl or heteroaryl ring. In certain embodiments, for a compound of Formula (I), (IV), (IV-A), (IV-B), or (IV-C), $R^3$ and $R^4$ are joined to form an optionally substituted aryl or heteroaryl ring, and $R^5$ and $R^6$ are joined to form an optionally substituted aryl or heteroaryl ring. In certain embodiments, for a compound of Formula (I), (IV), (IV-A), (IV-B), or (IV-C), $R^1$ and $R^2$ are joined to form an optionally substituted aryl or heteroaryl ring, and $R^3$ and $R^4$ are joined to form an optionally substituted aryl or heteroaryl ring, and $R^5$ and $R^6$ are joined to form an optionally substituted aryl or heteroaryl ring.

In certain embodiments, a compound of Formula (I) comprises the structure:

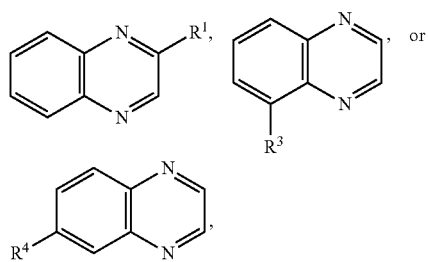

or a salt thereof, wherein $R^1$, $R^3$, and $R^4$ are as described above in connection with Formula (I).

In certain embodiments, a compound of Formula (I) comprises the structure:

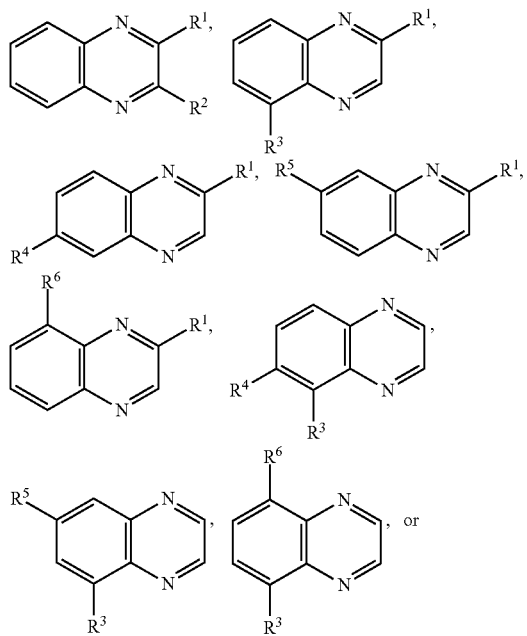

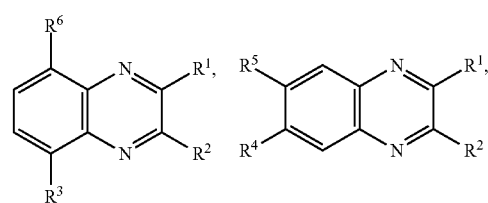

or a salt thereof, wherein $R^1$, $R^2$, $R^3$, $R^4$, $R^5$, and $R^6$ are as described above in connection with Formula (I).

In certain embodiments, a compound of Formula (I) comprises the structure:

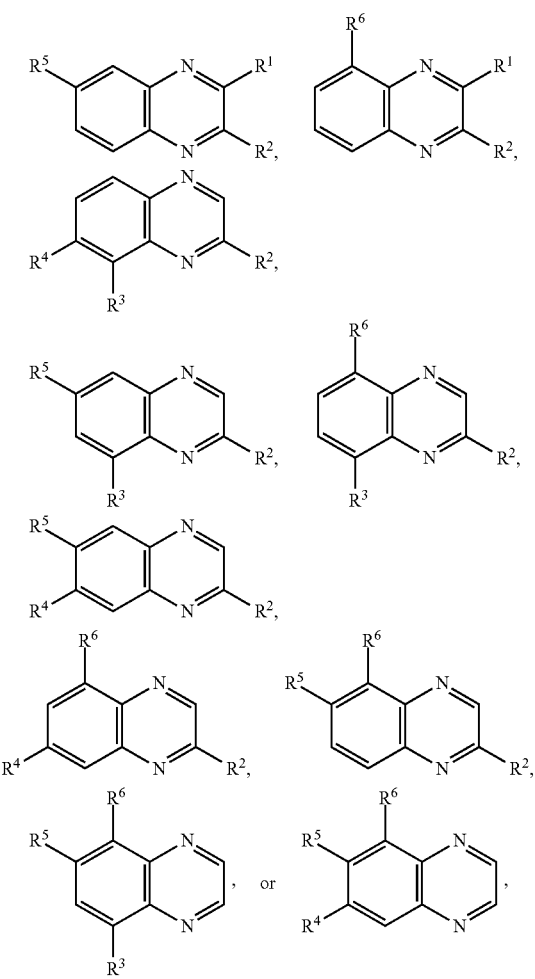

or a salt thereof, wherein $R^1$, $R^2$, $R^3$, $R^4$, $R^5$, and $R^6$ are as described above in connection with Formula (I).

In certain embodiments, a compound of Formula (I) comprises the structure:

-continued

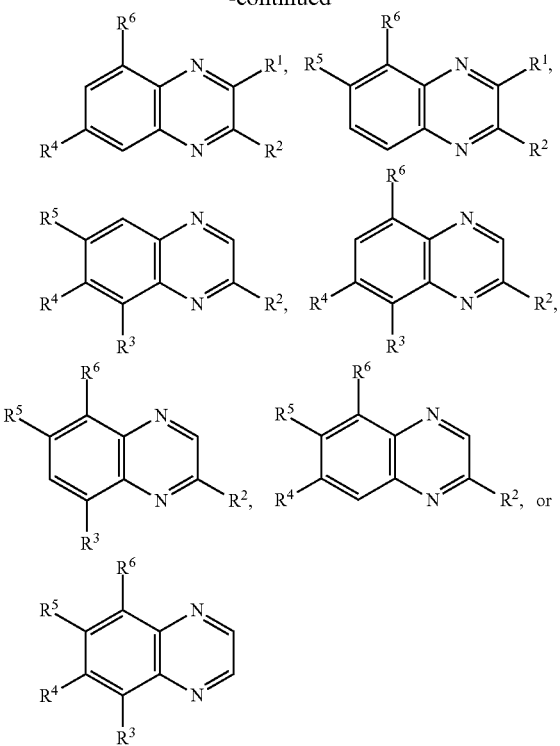

or a salt thereof, wherein $R^1$, $R^2$, $R^3$, $R^4$, $R^5$, and $R^6$ are as described above in connection with Formula (I).

In certain embodiments, a compound of Formula (I) comprises the structure:

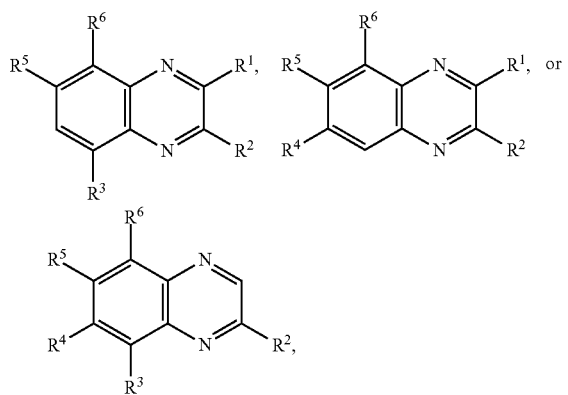

or a salt thereof, wherein $R^1$, $R^2$, $R^3$, $R^4$, $R^5$, and $R^6$ are as described above in connection with Formula (I).

In certain embodiments, a compound of Formula (I) comprises the structure:

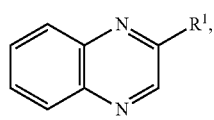

or a salt thereof, wherein $R^1$, $R^2$, $R^3$, $R^4$, $R^5$, and $R^6$ are as described above in connection with Formula (I).

In certain embodiments, a compound of Formula (I) comprises the structure:

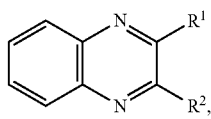

or a salt thereof, wherein $R^1$, $R^2$, $R^3$, $R^4$, $R^5$, and $R^6$ are as described above in connection with Formula (I).

In certain embodiments, the first redox active material comprises the structure:

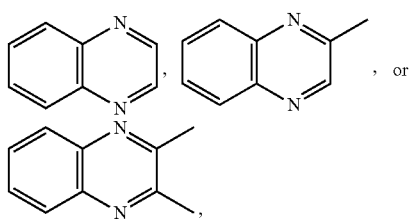

or a salt thereof.

Quinoxaline moieties may undergo oxidation or reduction. These oxidations or reductions may be one electron redox events or multiple electron redox events. In certain embodiments, a quinoxaline moiety is reduced or oxidized by one electron. In certain embodiments, a quinoxaline moiety is reduced or oxidized by two electrons. In certain embodiments, a quinoxaline moiety is reduced or oxidized by three or more electrons.

In certain embodiments, a quinoxaline moiety is reduced by a single electron to form a radical. In certain embodiments, a quinoxaline moiety is reduced by two electrons. In certain embodiments, the two electron reduction comprises essentially simultaneous transfer of both electrons. In certain embodiments, the two electron reduction comprises stepwise electron transfer. Several reduced forms of a quinoxaline moiety are possible depending on the potential of the electrolyte and the pH, as depicted in Scheme 1. It should be understood that the structures presented in Scheme 1 are in no way meant to limit the possible forms of quinoxaline or its reduced derivatives, and other isomeric or tautomeric forms may be present. In Scheme 1, the radicals and anionic charges are depicted, for convenience, as localized at the nitrogen atoms of the quinoxaline moiety, but may be delocalized or localized at other atoms of the molecules, and may be better depicted by alternative resonance structures. The equilibrium arrows in Scheme 1 are not intended to indicate a reaction mechanism of the electron and proton transfers between forms of the quinoxaline moiety, but are useful to indicate the net change in the number of electrons and protons present in each species.

Scheme 1.

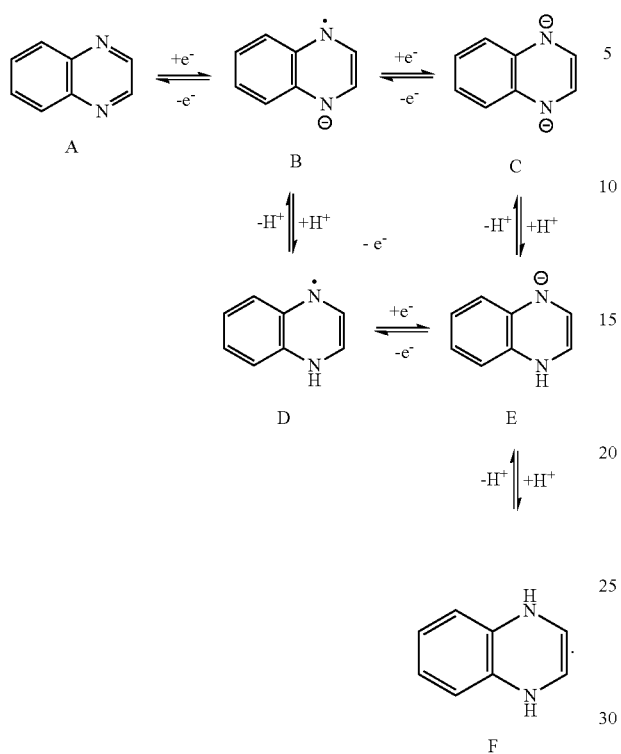

A quinoxaline moiety used in an embodiment of the flow battery may be provided in either the quinoxaline form, as depicted in structure A, or in any of the reduced forms, including radicals, anions, and protonated species, as depicted in structures B-F. In certain embodiments, the quinoxaline moiety may be provided as a mixture of forms. The dianionic charge of the two electron reduced form C may be balanced by cations present in the electrolyte solution. The reduced quinoxaline forms B or C may also be protonated if there are protons or a proton source present in solution to give protonated forms D, E, or F. In certain embodiments, the proton source is water. The two electron reduced quinoxaline form may be singly protonated to form a monoanionic form E or doubly protonated to form a neutral form F. In certain embodiments, the redox potential of a one electron or two electron step may vary with the pH of the solution. In certain embodiments, the redox event may be considered proton-coupled.

In certain embodiments, a quinoxaline moiety of Formula (I) may be reduced to form a compound of Formula (I-B) in a two electron event according to the reaction:

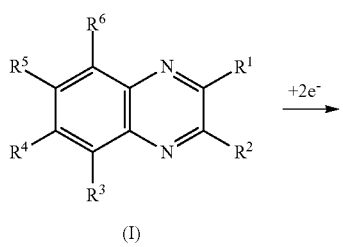

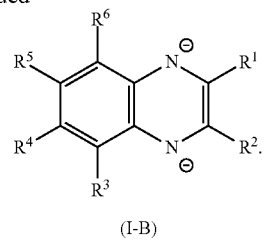

In some embodiments, a flow battery provided herein comprising a first type of redox active material comprising a quinoxaline moiety provides a method for storing or releasing energy. In certain embodiments, the method of storing energy comprises applying a potential difference across the first and second electrode of the flow battery, wherein the first redox active material is reduced. In certain embodiments, the method of storing energy comprises applying a potential difference across the first and second electrode of the flow battery, wherein one or more quinoxaline moieties of the first redox active material are reduced. In certain embodiments, the method of storing energy comprises applying a potential difference across the first and second electrode of the flow battery, wherein a compound of Formula (I), or salt thereof, is reduced. In certain embodiments, the method of storing energy comprises applying a potential difference across the first and second electrode of the flow battery, wherein a compound of Formula (I), or salt thereof, is reduced to a compound of Formula (I-B), or salt thereof. In certain embodiments, the method of releasing energy comprises applying a potential difference across the first and second electrode of the flow battery, wherein the first redox active material is oxidized. In certain embodiments, the method of releasing energy comprises applying a potential difference across the first and second electrode of the flow battery, wherein the reduced forms of one or more quinoxaline moieties of the first active material are oxidized. In certain embodiments, the method of releasing energy comprises applying a potential difference across the first and second electrode of the flow battery, wherein a compound of Formula (I-B), or salt thereof, is oxidized. In certain embodiments, the method of releasing energy comprises applying a potential difference across the first and second electrode of the flow battery, wherein a compound of Formula (I), or salt thereof, is oxidized to a compound of Formula (I-B), or salt thereof.

The first type of aqueous electrolyte and the second type of aqueous electrolyte may have any suitable pH. The pH of the first type and the second type of the electrolyte may be the same or different. In certain embodiments, the first and/or second aqueous electrolyte has a pH between about 7 and about 15. In certain embodiments, the first and/or second aqueous electrolyte has a pH between about 7 and about 14. In certain embodiments, the first and/or second aqueous electrolyte has a pH between about 7 and about 10, about 10 and about 12, or about 12 and about 14. In certain embodiments, the first and/or second aqueous electrolyte has a pH between about 8 and about 14. In certain embodiments, the first and/or second aqueous electrolyte has a pH between about 9 and about 14. In certain embodiments, the first and/or second aqueous electrolyte has a pH between about 10 and about 14. In certain embodiments, the first and/or second aqueous electrolyte has a pH between about 11 and about 14. In certain embodiments, the first and/or second aqueous electrolyte has a pH between about 12 and about 14.

In certain embodiments, the first and/or second aqueous electrolyte has a pH between about 7 and about 8. In certain embodiments, the first and/or second aqueous electrolyte has a pH between about 8 and about 9. In certain embodiments, the first and/or second aqueous electrolyte has a pH between about 9 and about 10. In certain embodiments, the first and/or second aqueous electrolyte has a pH between about 10 and about 11. In certain embodiments, the first and/or second aqueous electrolyte has a pH between about 11 and about 12. In certain embodiments, the first and/or second aqueous electrolyte has a pH between about 12 and about 13. In certain embodiments, the first and/or second aqueous electrolyte has a pH between about 13 and about 14. In certain embodiments, the first and/or second aqueous electrolyte has a pH between about 14 and about 15.

As noted herein, in certain embodiments, the second aqueous electrolyte has a pH that is the about the same as the pH of the first aqueous electrolyte. In other embodiments, the pH may be different. For example, the second aqueous electrolyte may have a pH that is within about 2 pH units of the pH of the first aqueous electrolyte, or the second aqueous electrolyte may have a pH that differs by between about 2 and about 5 pH units from the pH of the first aqueous electrolyte, or the second aqueous electrolyte may have a pH that differs by between about 5 and about 10 pH units from the pH of the first aqueous electrolyte, or the second aqueous electrolyte may have a pH that differs by between about 10 and about 16 pH units from the pH of the first aqueous electrolyte.

The first type of redox active material may be present in the first aqueous electrolyte in any suitable amount and the second redox active material may be present in the second aqueous electrolyte in any suitable amount. In certain embodiments, the concentration of the redox active material determined is the total of the concentration of all distinct species comprising the redox active material. In certain embodiments, the redox active material comprises a single redox active material (e.g., quinoxaline). In certain embodiments, the redox active material comprises multiple types of redox active materials (e.g., 50% quinoxaline, 50% 2-methylquinoxaline). The number of types of redox active materials that comprise the redox active material is not limited, and not all components need be a quinoxaline. In certain embodiments, the redox active material comprises one or more type of quinoxaline redox active materials and one or more types of non-quinoxaline redox active materials.

In certain embodiments, the first type of redox active material comprises one or more types of quinoxaline moieties (e.g., compounds of Formula (I)). In certain embodiments, the first type of redox active material comprises two types of quinoxaline moieties (e.g., compounds of Formula (I)). In certain embodiments, the first type of redox active material comprises three or more quinoxalines (e.g., compounds of Formula (I)). In certain embodiments, the first type of redox active material comprises one or more types of quinoxaline moieties (e.g., compounds of Formula (I)), and one or more additional types of non-quinoxaline redox active materials. The additional type of redox active material is not limited to types of quinoxalines moieties (e.g., compounds of Formula (I)). In certain embodiments, the additional type of redox active material comprises a metal, metal salt, or metal-ligand coordination compound. In certain embodiments, the additional type of redox active material comprises vanadium. In certain embodiments, the additional type of redox active material comprises iron. In certain embodiments, the additional type of redox active material comprises chromium. In certain embodiments, the additional type of redox active material comprises manganese. In certain embodiments, the additional type of redox active material comprises titanium. In certain embodiments, the additional type of redox active material comprises zinc. In certain embodiments, the additional type of redox active material comprises an inorganic compound. In certain embodiments, the additional type of redox active material comprises bromine. In certain embodiments, the additional type of redox active material comprises an organic compound. In certain embodiments, the additional type of redox active material comprises a hexacyanoiron complex, a quinone, a hydroquinone, or an organic dye, or a salt or mixture thereof. In certain embodiments, the additional type of redox active material comprises a hexacyanoiron complex. In certain embodiments, the additional type of redox active material comprises ferrocyanide. In certain embodiments, the additional type of redox active material comprises ferricyanide. In certain embodiments, the additional type of redox active material comprises a quinone, hydroquinone, sulfonated quinone, or sulfonated hydroquinone. In certain embodiments, the additional type of redox active material comprises 1,2-dihydroxy-3,5-benzene disulfonate (Tiron). In certain embodiments, the additional type of redox active material comprises 1,2,4-trihydroxy-3,5-benzenedisulfonate. In certain embodiments, the additional type of redox active material comprises an anthraquinone or sulfonated anthraquinone. In certain embodiments, the additional type of redox active material comprises 9,10-anthraquinone. In certain embodiments, the additional type of redox active material comprises 9,10-anthraquinone-2,7-disulphonic acid. In certain embodiments, the additional type of redox active material comprises an organic dye. In certain embodiments, the additional type of redox active material comprises indigo carmine. In certain embodiments, the additional type of redox active material comprises a viologen. In certain embodiments, the additional type of redox active material comprises methyl viologen or benzylviologen. In certain embodiments, the additional type of redox active material comprises a tetrazole, diaryl ketone, dipyridyl ketone, dialkoxy benzene, phenothiazine, catechol, catechol ether, or catechol phenylborate ester. In certain embodiments, the additional type of redox active material comprises di-(2-pyridyl)-ketone, 2,5-di-tert-butyl-1,4-bis(2-methoxyethoxy)benzene (DBBB), 2,5-di-tert-butyl-1,4-dimethoxybenzene, 2,5-di-tert-butyl-1,4-bis(2,2,2-trifluoroethoxy)benzene, phenothiazine, catechol, tetrafluorocatechol, or 5,6,7,8-tetrafluoro-2,3-dihydrobenzodioxine. In certain embodiments, the additional type of redox active material comprises 5-mercapto-1-methyltetrazole.

In certain embodiments, the concentration of the first type of redox active material in the first aqueous electrolyte is between about 0.5 M and about 12 M. In certain embodiments, the concentration of the first type of redox active material in the first aqueous electrolyte is at least about 0.5 M, at least about 1 M, at least about 2 M, at least about 4 M, or at least about 6 M. In certain embodiments, the concentration of the first type of redox active material in the first aqueous electrolyte is between about 0.5 M and about 2 M, between about 2 M and about 4 M, between about 4 M and about 6 M, or between about 6 M and about 10 M. In certain embodiments, the concentration of the first type of redox active material in the first aqueous electrolyte is between about 1 M and about 10 M. In certain embodiments, the concentration of the first type of redox active material in the first aqueous electrolyte is between about 2 M and about 8 M. In certain embodiments, the concentration of the first type of redox active material in the first aqueous electrolyte is between about 4 M and about 6 M. In certain embodiments, the concentration of the first type of redox active material in the first aqueous electrolyte is between about 0.5 M and about 1 M. In certain embodiments, the concentration of the first type of redox active material in the first aqueous electrolyte is between about 1 M and about 1.5 M. In certain embodiments, the concentration of the first type of redox active material in the first aqueous electrolyte is between about 1.5 M and about 2 M. In certain embodiments, the concentration of the first type of redox active material in the first aqueous electrolyte is between about 2 M and about 3 M. In certain embodiments, the concentration of the first type of redox active material in the first aqueous electrolyte is between about 3 M and about 4 M. In certain embodiments, the concentration of the first type of redox active material in the first aqueous electrolyte is between about 4 M and about 5 M. In certain embodiments, the concentration of the first type of redox active material in the first aqueous electrolyte is between about 5 M and about 6 M. In certain embodiments, the concentration of the first type of redox active material in the first aqueous electrolyte is between about 6 M and about 7 M. In certain embodiments, the concentration of the first type of redox active material in the first aqueous electrolyte is between about 7 M and about 8 M. In certain embodiments, the concentration of the first type of redox active material in the first aqueous electrolyte is between about 8 M and about 9 M. In certain embodiments, the concentration of the first type of redox active material in the first aqueous electrolyte is between about 9 M and about 10 M. In certain embodiments, the concentration of the first type of redox active material in the first aqueous electrolyte is between about 10 M and about 11 M. In certain embodiments, the concentration of the first type of redox active material in the first aqueous electrolyte is between about 11 M and about 12 M.

The second type of redox active material may be the positive active material or the negative active material. In certain embodiments, the second type of redox active material comprises a quinoxaline moiety. In certain embodiments, the second type of redox active material comprises a compound of Formula (I). In certain embodiments, the second type of redox active material is the same as the first type of redox active material. In certain embodiments, the second type of redox active material comprises a metal, metal salt, or metal-ligand coordination compound. In certain embodiments, the second type of redox active material comprises vanadium. In certain embodiments, the second type of redox active material comprises iron. In certain embodiments, the second type of redox active material comprises chromium. In certain embodiments, the second type of redox active material comprises manganese. In certain embodiments, the second type of redox active material comprises titanium. In certain embodiments, the second type of redox active material comprises zinc. In certain embodiments, the second type of redox active material comprises an inorganic compound. In certain embodiments, the second type of redox active material comprises bromine. In certain embodiments, the second type of redox active material comprises an organic compound. In certain embodiments, the second type of redox active material comprises a hexacyanoiron complex, a quinone, a hydroquinone, or an organic dye, or a salt or mixture thereof. In certain embodiments, the second type of redox active material comprises a hexacyanoiron complex. In certain embodiments, the second type of redox active material comprises ferrocyanide. In certain embodiments, the second type of redox active material comprises ferricyanide. In certain embodiments, the second type of redox active material comprises a quinone, hydroquinone, sulfonated quinone, or sulfonated hydroquinone. In certain embodiments, the second type of redox active material comprises 1,2-dihydroxy-3,5-benzene disulfonate (Tiron). In certain embodiments, the second type of redox active material comprises 1,2,4-trihydroxy-3,5-benzenedisulfonate. In certain embodiments, the second type of redox active material comprises an anthraquinone or sulfonated anthraquinone. In certain embodiments, the second type of redox active material comprises 9,10-anthraquinone. In certain embodiments, the second type of redox active material comprises 9,10-anthraquinone-2,7-disulphonic acid. In certain embodiments, the second type of redox active material comprises an organic dye. In certain embodiments, the second type of redox active material comprises indigo carmine. In certain embodiments, the second type of redox active material comprises a viologen. In certain embodiments, the second type of redox active material comprises methyl viologen or benzylviologen. In certain embodiments, the second type of redox active material comprises a tetrazole, diaryl ketone, dipyridyl ketone, dialkoxy benzene, phenothiazine, catechol, catechol ether, or catechol phenylborate ester. In certain embodiments, the second type of redox active material comprises di-(2-pyridyl)-ketone, 2,5-di-tert-butyl-1,4-bis(2-methoxyethoxy)benzene (DBBB), 2,5-di-tert-butyl-1,4-dimethoxybenzene, 2,5-di-tert-butyl-1,4-bis(2,2,2-trifluoroethoxy)benzene, phenothiazine, catechol, tetrafluorocatechol, or 5,6,7,8-tetrafluoro-2,3-dihydrobenzodioxine. In certain embodiments, the second type of redox active material comprises 5-mercapto-1-methyltetrazole.

When the redox active material comprises more than one type of redox active material, the reduction potentials of any two such compounds may be substantially the same (e.g., within 20 mV), similar (e.g., differing by between 20 and 200 mV), or substantially different (e.g., differing by more than 200 mV).

In addition to one or more types of redox active material, the first and second aqueous electrolyte may further comprise acids, bases, salts, supporting electrolytes, additives, or co-solvents. In certain embodiments, the first aqueous electrolyte comprises HCl, $H_2SO_4$, $HClO_4$, $H_3PO_4$, or $HNO_3$, or a mixture thereof. In certain embodiments, the first aqueous electrolyte comprises LiOH, NaOH, KOH, or a mixture thereof. In certain embodiments, the first aqueous electrolyte comprises LiCl, NaCl, KCl, or a mixture thereof. In certain embodiments, the first aqueous electrolyte comprises between about 0.5 and about 5 M LiCl, between about 0.5 and about 5 M NaCl, between about 0.5 and about 5 M KCl, or a mixture thereof such that the combined concentration is between about 0.5 and about 5 M. In certain embodiments, the first aqueous electrolyte comprises $Li_2SO_4$, $Na_2SO_4$, $K_2SO_4$, or a mixture thereof. In certain embodiments, the first aqueous electrolyte comprises between about 0.5 and about 5 M $Li_2SO_4$, between about 0.5 and about 5 M $Na_2SO_4$, between about 0.5 and about 5 M $K_2SO_4$, or a mixture thereof such that the combined concentration is between about 0.5 and about 5 M. In certain embodiments, the first aqueous electrolyte comprises a nitrate, phosphate, carbonate, perchlorate, or borate salt of lithium, sodium, or potassium, or any combination or mixture thereof.

The second aqueous electrolyte may be the same as the first aqueous electrolyte, or may be different than the first aqueous electrolyte, or the two electrolytes may comprise partly the same materials and partly different materials. In certain embodiments, the second aqueous electrolyte comprises HCl, $H_2SO_4$, $HClO_4$, $H_3PO_4$, or $HNO_3$, or a mixture thereof. In certain embodiments, the second aqueous electrolyte comprises LiOH, NaOH, KOH, or a mixture thereof. In certain embodiments, the second aqueous electrolyte comprises LiCl, NaCl, KCl, or a mixture thereof. In certain embodiments, the second aqueous electrolyte comprises between 0.5 and 5 M LiCl, between about 0.5 and about 5 M NaCl, between about 0.5 and about 5 M KCl, or a mixture thereof such that the combined concentration is between about 0.5 and about 5 M. In certain embodiments, the second aqueous electrolyte comprises $Li_2SO_4$, $Na_2SO_4$, $K_2SO_4$, or a mixture thereof. In certain embodiments, the second aqueous electrolyte comprises between about 0.5 and about 5 M $Li_2SO_4$, between about 0.5 and about 5 M $Na_2SO_4$, between about 0.5 and about 5 M $K_2SO_4$, or a mixture thereof such that the combined concentration is between about 0.5 and about 5 M. In certain embodiments, the second aqueous electrolyte comprises a nitrate, phosphate, carbonate, perchlorate, or borate salt of lithium, sodium, or potassium, or any combination or mixture thereof.

An electrolyte of a flow battery described herein may feature one or more type of salt component. The cation of any type of salt component may be a monovalent cation (e.g., $H^+$, $Li^+$, $Na^+$, $K^+$, $NH_4^+$, $Cu^+$) or a multivalent cation (e.g., Me, $Ca^{2+}$, $Cu^{2+}$, $Zn^{2+}$). In some embodiments, the cation comprises an alkali metal. In some embodiments, the cation comprises an $Li^+$, $Na^+$, or $K^+$, or a mixture thereof. In some embodiments, the cation comprises an alkaline earth metal. In some embodiments, the cation comprises a transition metal. In some embodiments, the cation comprises an organic cation. In some embodiments, the cation comprises $H^+$. The anion of any type of salt component may be any anion suitable for an aqueous flow battery. In some embodiments, the anion comprises a hydroxide. In some embodiments, the anion comprises a halogen. In some embodiments, the anion comprises a phosphate, sulfate, perchlorate, nitrate, or borate. The electrolyte may also comprise a type of buffer to regulate pH. Non-limiting examples of types of aqueous buffers include citrates, carbonates, phosphates, borates, or organic buffers (e.g., ammonium salts, pyridinium salts, carboxylates, sulfonates, alkoxides).

Non-limiting examples of flow batteries are now described in detail. In some embodiments, the flow battery comprises a separator between the first and second electrolytes. The term separator is given its ordinary meaning in the art when used in the context of flow batteries and generally refers to a material which prevents two fluids from freely mixing. In certain embodiments, the term separator is synonymous with membrane. Separators may be classified as permeable, semi-permeable, or non-permeable. The degree of permeability is dependent on the size of pores in a separator, the character (e.g., charge, hydrophobicity) of the pores, and the character of the electrolyte or electrolyte component which is to be transported across the separator. A porous separator is considered permeable to all electrolyte components, though the degree of permeability may differ for different component species of the electrolyte (e.g., based on size). A semi-permeable separator typically is selectively permeable to certain materials (e.g., small cations, small anions, $H_2O$) while being substantially non-permeable to other materials (e.g., large molecules, neutral species, a type of redox active material). In certain embodiments, the separator is selectively permeable to permit the flux of cations with low resistance, and may be termed "cation permeable" or "cation conductive". In certain embodiments, the separator is selectively permeable to permit the flux of anions with low resistance, and may be termed "anion permeable" or "anion conductive". An ion selective separator may comprise functional groups of opposite charge to the permitted ion, such that the charge of the functional group repels ions of like charge. The separator may comprise one or more separator materials. In certain embodiments, the separator is a porous separator. In certain embodiments, the separator is a non-porous separator permeable to ions. In certain embodiments, the separator is cation permeable. In certain embodiments, the separator is anion permeable. In certain embodiments, the separator is a cation exchange membrane. In certain embodiments, the separator is an anion exchange membrane. In certain embodiments, the separator is a sulfonate containing fluoropolymer, such as NAFION®. In certain embodiments, the separator is a sulfonated poly(ether ether ketone), polysulfone, polyethyelene, polypropylene, ethylene-propylene copolymer, polyimide, or polyvinyldifluoride.

In certain embodiments, the separator comprises and ion conductive, ceramic, zeolite, or glass. Ion conductive ceramics, zeolites, and glasses are solid materials in which certain ions have high mobility. In certain embodiments, an ion conductive ceramic, zeolite, or glass may be permeable to a flux of a certain ion (e.g., $Li^+$, $Na^+$, $K^+$) but be substantially non-permeable to a flux of another ion (e.g., $H^+$). In certain embodiments, an ion conductive solid ceramic, zeolite, or glass may be utilized to maintain a pH imbalance between the first and second electrolytes. In certain embodiments, the separator comprises a cation conducting ceramic, cation conducting zeolite, or cation conducting glass. In certain embodiments, the separator comprises an anion conducting ceramic, an anion conducting zeolite, or an anion conducting glass. In certain embodiments, the separator comprises a cation conducting ceramic. In certain embodiments, the separator comprises a cation conducting zeolite. In certain embodiments, the separator comprises or cation conducting glass. In certain embodiments, the separator is not permeable to protons or hydroxide anions. In certain embodiments, the separator is not permeable to quinoxaline moieties and/or reduced quinoxaline moieties. In certain embodiments, the separator is permeable to quinoxaline moieties and/or reduced quinoxaline moieties. In certain embodiments, the cation permeable separator is not permeable to protons. In certain embodiments, the anion permeable separator is not permeable to hydroxide anions.

In certain embodiments, the separator comprises multiple components. In certain embodiments, the separator comprises two or more layered membranes or a coated membrane. In certain embodiments, the separator comprises a porous membrane coated with a cation conducting ceramic, cation conducting zeolite, or cation conducting glass. In certain embodiments, the separator comprises a cation exchange membrane coated with a cation conducting ceramic, cation conducting zeolite, or cation conducting glass. In certain embodiments, the separator may have a thickness of less than about 200 microns, less than about 100 microns, less than about 50 microns, or less than about 25 microns.

The battery may comprise a first and second electrode. In certain embodiments, the first and second electrode comprise the same material. In certain embodiments, the first and second electrode comprise different materials. In certain embodiments, one or more electrodes comprise one or more metal. In certain embodiments, one or more electrodes comprise one or more metal oxide. In certain embodiments, one or more electrodes comprise a carbon material. In certain embodiments, one or more electrodes comprise solely a carbon material. The term "carbon material" refers to materials which are primarily composed of the element carbon, but need not be 100 percent carbon. Carbon materials typically contain other elements, such as hydrogen, sulfur, oxygen, and nitrogen. In certain embodiments, one or more electrodes comprise glassy carbon. In certain embodiments, one or more electrode comprise a carbon felt, carbon mesh, carbon foam, carbon cloth, carbon paper, or carbon plate. In certain embodiments, one or more electrodes comprise high surface area carbon. The electrode or electrodes may be coated with a catalyst, such as high surface area carbon, to improve the efficiency of charge transfer at the electrode, for example, to reduce the charging and/or discharging overpotential. The electrode or electrodes may be coated with a poison, such as lead, to reduce the efficiency of current transfer, for example to reduce the current density of the hydrogen evolution reaction.

FIG. 2 shows a non-limiting embodiment of an electrochemical cell of a redox flow battery. This example is non-limiting, and the electrochemical cells and battery described herein may have different configurations. A positive electrolyte comprising a positive redox active material (represented by "A") flows through chamber 31 and contacts positive electrode 11. A negative electrolyte comprising a negative redox active material (represented by "B") flows through chamber 32 and contacts negative electrode 12. The positive and negative electrolyte chambers are separated by separator 15. The positive and negative electrodes are electrically connected via wires 21 and 22 to an electrical power supply or load 25 (represented by "V").

During charge (represented by solid arrows) electrons move from power supply 25 through wire 22 to electrode 12 and are transferred to molecules or ions of the negative active material ("B"), converting those species to reduced form(s) (represented by "$B^{31}$"). Electrons are also transferred from molecules or ions of the positive active material ("A") to electrode 11, and through wire 21 to power supply 25, converting those species to oxidized form(s) (represented by "$A^+$"). The circuit is completed by the transfer of charged ions (represented by "$Li^+$") from the positive electrolyte in chamber 31 to the negative electrolyte in chamber 32 through cation permeable membrane 15.

During discharge (represented by dashed arrows) electrons move from electrical load 25 through wire 21 to electrode 11 and are transferred to molecules or ions of the oxidized positive active material ("$A^+$"), converting it to reduced form(s) (represented by "A"). Electrons are also transferred from molecules or ions of the reduced negative active material ("$B^-$") to electrode 12, and through wire 22 to electrical load 25, converting those species to oxidized form(s) (represented by "B"). The circuit is completed by the transfer of charged ions (represented by "$Li^+$") from the negative electrolyte in chamber 32 to the positive electrolyte in chamber 31 through cation permeable membrane 15.

The flow battery may further comprise other components including, but not limited to, pumps, tanks, piping, control hardware, control software, and power conditioning or conversion equipment. Some or all of these components may be used to connect a flow battery to the electrical grid or to electrical devices. In certain embodiments, the flow battery may comprise both single electrochemical cells or multiple electrochemical cells. Multiple electrochemical cells are typically arranged in cell stacks and electrically connected in series. In certain embodiments, the cells are electrically connected via bipolar plates between the cells. The term bipolar plate is given its ordinary meaning in the art and generally refers to an electrically conductive, non-porous material used to separate two cells in an electrochemical cell stack. One surface of the bipolar plate serves as the negative electrode for the cell in which that surface contacts a negative electrolyte, and the other surface serves as the positive electrode for the cell in which that surface contacts a positive electrode. In certain embodiments, the cells are fluidically connected in parallel, such that for each electrolyte flow is provided to the individual electrochemical cells of the stack from one or more common manifold. Connecting cells serially in a stack allows for the battery to have higher charge and discharge voltages than that of a single cell. The voltages for the stack are additive for each cell. In certain embodiments, the cell stack may comprise one cell, tens of cells, hundreds of cells, or thousands of cells. In some embodiments, the battery may comprise one stack. In some embodiments, the battery may comprise more than one stack.

FIG. 1 shows a non-limiting example of one embodiment of a flow battery system. A one cell stack is drawn in the schematic for clarity. In FIG. 1, the negative electrolyte is contained in a circulation loop comprising tank 42, pump 52, cell chamber(s) 62, tubing, and manifolds necessary to connect them. The positive electrolyte is contained in a circulation loop comprising tank 41, pump 51, cell chamber 61, tubing, and manifolds necessary to connect them. During operation the negative electrolyte flows from tank 41 through tubes to pump 51, through tubes to the stack manifolds and into cell chamber 61, before returning through stack manifolds and tubes back to tank 41. As the negative electrolyte flows through cell chamber 61, the negative redox active materials of the negative electrolyte are reduced or oxidized, depending on the potential applied to the negative electrode 71. During operation the positive electrolyte flows from tank 42 through tubes to pump 52, through tubes to the stack manifolds and into cell chamber 62, before returning through stack manifolds and tubes back to tank 42. As the positive electrolyte flows through cell chamber 62, the positive redox active materials of the positive electrolyte are reduced or oxidized, depending on the potential applied to the positive electrode 72. Separator (e.g., membrane) 75 allows for the movement of charged ions between the electrolytes to complete the circuit.

In certain embodiments, the flow battery may further comprise a first circulation loop comprising a storage tank containing the first aqueous electrolyte, piping for transporting the first aqueous electrolyte, a chamber in which the first electrode is in contact with the first aqueous electrolyte, and a pump to circulate the first aqueous electrolyte through the circulation loop; optionally a second circulation loop comprising a storage tank containing the first aqueous electrolyte, piping for transporting the first aqueous electrolyte, a chamber in which the first electrode is in contact with the first aqueous electrolyte, and a pump to circulate the first aqueous electrolyte through the circulation loop; and control hardware and software.

The circulation loops of the flow battery may comprise any valves, rigid or flexible tubes, pipes, bypass loops, manifolds, joints, openings, apertures, filters, pumps, gas inlets and outlets, pressurizing devices, pressure release features, pressure equalizing features, flow features, or any other features suitable for systems for liquid and gas handling. The system may comprise any controllers, sensors, meters, alarms, wires, circuits, switches, signal filters, computers, microprocessors, control software, power supplies, load banks, data recording equipment, power conversion equipment, and other devices suitable for operating a battery.

In some embodiments, the flow battery described herein is capable of operating with high round energy efficiency. The term "energy efficiency" or "round trip efficiency" refers to the ratio of total energy obtained from discharge to the energy provided during charge in a cycle.

The energy efficiency may be calculated as the product of the voltage efficiency and current efficiency, which are defined herein. In certain embodiments, the round trip efficiency is at least about 70%, at least about 75%, at least about 80%, at least about 85%, or at least about 90%. In certain embodiments, the round trip current efficiency is at least about 95%, at least about 98%, at least about 99%, at least about 99.5%, at least about 99.9% or at least about 99.99%.

In some embodiments, the flow battery described herein is capable of achieving high energy densities. The term energy density is given its ordinary meaning in the art and generally refers to the amount of energy that may be stored, per unit volume, in the active materials of a battery. The energy density can be dependent on numerous factors, including, but not limited to, overpotential, cell resistances, component resitances, shunt currents, current shorts, voltage efficiency, current efficiency, and power conversion efficiency. Accounting only for the charge concentration of the redox active materials and the open circuit potential, an electrolyte-only energy density is defined. This electrolyte-only energy density assumes that 100% of each active material is used to store charge, though this utilization may be less in a particular embodiment. The electrolyte-only energy density for a flow battery may be calculated according to Eq. (1):

$$\text{Electrolyte-only energy density} = \frac{n}{2} \frac{F}{3600 \ C \cdot Ah} OCV \times [conc] \quad \text{Eq. (1)}$$

where n is the number of moles of electrons transferred per mole of active material, F is the Faraday constant, [conc] is the total molar concentration of the active material (lower concentration if the positive and negative active material concentrations are not equal), and OCV is as defined herein for a battery with electrolytes at 50% state of charge. In certain embodiments, the electrolyte-only energy density is between about 5 and about 10 Wh/L, between about 10 and about 20 Wh/L, between about 20 and about 40 Wh/L, or between 40 and 60 Wh/L. Those of ordinary skill in the art will be aware of methods and systems for determining the energy density of a flow battery, for example, determining the [conc] and n using spectroscopic or electrochemical methods, and measuring the voltage difference between the two electrolytes at 50% state of charge to determine the OCV.

Definitions

Throughout this specification, words are to be afforded their normal meaning, as would be understood by those skilled in the art. Certain terms are specifically defined or clarified to avoid misunderstanding.

The term "OCV" or "open circuit potential" or "open circuit voltage" is defined by Eq. (2):

$$OCV = E^{positive} - E^{negative} \quad \text{Eq. (2)}$$

where $E^{positive}$ and $E^{negative}$ are the redox potentials of the half-cell reactions that occur at the positive and negative electrodes, respectively. The OCV can be measured as the voltage difference between the negative and positive electrode of a cell when no current is passing. The OCV may change with state of charge because the half-cell reduction potentials vary with the ratio of reduced and oxidized species present. The potential of the half-cell reaction is defined by the Nernst equation (Eq. (3)):

$$E = E^\circ - RT/nF \ln\left(\frac{a_{ox}}{a_{red}}\right) \quad \text{Eq. (3)}$$

where $E^\circ$ is the standard half-cell reduction potential, R is the universal gas constant, T is temperature, n is the number of moles of electrons transferred in the reaction, F is the Faraday constant, and $a_{ox}$ and $a_{red}$ are the activities of the oxidized and reduced forms of the species undergoing the redox event. The activities are typically approximated as the concentrations.

The term "current density" refers to the current per unit geometric area passed by an electrochemical cell. The current density may be determined by measuring the amount of current passed by a cell and dividing by the geometric area of the electrode.

The term "current efficiency" refers to the ratio of total charge drawn during a period of discharge to the total charge passed during a corresponding period of charge. The current efficiency can be determined by counting the amp-hours passed while charging the battery between two states (e.g., 0% to 100% state of charge), and counting the amp-hours passed while discharging the battery to back to the original state (e.g., 100% to 0% state of charge), and dividing the amp-hours for the discharge step by the amp-hours for the charge step.

The term "voltage efficiency" of a battery refers to the ratio of the cell voltage at discharge to the voltage at charge. Voltage efficiency is determined for a given current density, for example by measuring the voltage at a given current density while charging and dividing by the voltage at the same current density while discharging. The voltage efficiency may be affected by a number of additional factors, including state of charge.

The term "state of charge" or "SOC" is well known in the art of flow batteries. The state of charge of an electrolyte is determined from the concentration of the charged form of the redox active material ($X_{charge}$) and the concentration of the discharged from of the redox active material ($X_{discharge}$) according to Eq. (4).

$$SOC \ \% = 100 \times \frac{X_{charge}}{X_{charge} + X_{discharge}} \quad \text{Eq. (4)}$$

When the concentrations of the charged and discharged forms of the redox active material are equal the ratio will be 1 and the SOC is 50%. At the negative electrode $X_{charge}$ is equal to the concentration of the reduced form of the active material ($X_{red}$), and $X_{discharge}$ is equal to the concentration of oxidized form of the active material ($X_{ox}$). At the positive electrode $X_{charge}$ is equal to the concentration of the reduced form of the active material ($X_{ox}$), and)($X_{discharge}$ is equal to the concentration of oxidized form of the active material ($X_{red}$). In certain embodiments, SOC is defined as the theoretical SOC assuming 100% of the redox active material can be converted to the charged and discharged form. In certain embodiments, SOC is defined based on the intended or achievable state of charge operating range of the battery. For example cycling between an SOC of 10% and an SOC of 90% of the theoretical range is an SOC swing of 80% of the theoretical range, but in certain embodiments this range defined as a 100% system SOC swing. For the full battery the state of charge is a function of the SOC's of both electrolytes. In certain embodiments, the SOC's of both electrolytes is equal and this SOC is equivalent to the SOC of the battery.

The term "fluid" refers to a substance that, under a shear stress at 25° C., continually flows (e.g., at a velocity of 1 millimeter per second) along a solid boundary. Examples of fluids include liquids (e.g., solvents and solutions), gases, and suspensions (where solids are suspended in a liquid or gas). A "nonfluid" is a substance that is not a fluid.

The terms "positive electrode" and "negative electrode" are defined such that the positive electrode is intended to operate as a potential more positive than that of the negative electrode. The positive electrode is associated with the positive electrolyte and the positive redox active material. The negative electrode is associated with the negative electrolyte and the negative redox active material. The first aqueous electrolyte may be the positive electrolyte such that the second aqueous electrolyte is the negative electrolyte, or the first aqueous electrolyte may be the negative electrolyte such that the second arouse electrolyte is the positive electrolyte.

Chemical Terms

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987.

Compounds described herein can comprise one or more asymmetric centers, and thus can exist in certain stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, N.Y., 1962); and Wilen, S. H. *Tables of Resolving Agents and Optical Resolutions* p. 268 (E. L. Eliel, Ed., Univ. of Notre Dame Press, Notre Dame, Ind. 1972). Additionally encompassed compounds are individual isomers substantially free of other isomers, and alternatively, mixtures of certain isomers.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn).

The term "haloalkyl" is a substituted alkyl group, wherein one or more of the hydrogen atoms are independently replaced by a halogen, e.g., fluoro, bromo, chloro, or iodo. "Perhaloalkyl" is a subset of haloalkyl, and refers to an alkyl group wherein all of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). In some embodiments, all of the haloalkyl hydrogen atoms are replaced with fluoro to provide a perfluoroalkyl group. In some embodiments, all of the haloalkyl hydrogen atoms are replaced with chloro to provide a "perchloroalkyl" group. Examples of haloalkyl groups include —$CF_3$, —$CF_2CF_3$, —$CF_2CF_2CF_3$, —$CCl_3$, —$CFCl_2$, —$CF_2Cl$, and the like.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("heteroC$_{1-8}$ alkyl"). In some embodiments, a heteroalkyl group is a saturated group having 1 to 7 carbon atoms and 1 or more heteroatoms within the parent chain ("heteroC$_{1-7}$ alkyl"). In some embodiments, a heteroalkyl group is a saturated group having 1 to 6 carbon atoms and 1 or more heteroatoms within the parent chain ("heteroC$_{1-6}$ alkyl"). In some embodiments, a heteroalkyl group is a saturated group having 1 to 5 carbon atoms and 1 or 2 heteroatoms within the parent chain ("heteroC$_{1-5}$ alkyl"). In some embodiments, a heteroalkyl group is a saturated group having 1 to 4 carbon atoms and 1 for 2 heteroatoms within the parent chain ("heteroC$_{1-4}$ alkyl"). In some embodiments, a heteroalkyl group is a saturated group having 1 to 3 carbon atoms and 1 heteroatom within the parent chain ("heteroC$_{1-3}$ alkyl"). In some embodiments, a heteroalkyl group is a saturated group having 1 to 2 carbon atoms and 1 heteroatom within the parent chain ("heteroC$_{1-2}$ alkyl"). In some embodiments, a heteroalkyl group is a saturated group having 1 carbon atom and 1 heteroatom ("heteroC$_1$ alkyl"). In some embodiments, a heteroalkyl group is a saturated group having 2 to 6 carbon atoms and 1 or 2 heteroatoms within the parent chain ("heteroC$_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted heteroC$_{1-10}$ alkyl. In certain embodiments, the heteroalkyl group is a substituted heteroC$_{1-10}$ alkyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 10 ring carbon atoms ("C$_{3-10}$ carbocyclyl"). In some embodiments, a carbocyclyl group has 3 to 8 ring carbon atoms ("C$_{3-8}$ carbocyclyl"). In some embodiments, a carbocyclyl group has 3 to 7 ring carbon atoms ("C$_{3-7}$ carbocyclyl"). In some embodiments, a carbocyclyl group has 3 to 6 ring carbon atoms ("C$_{3-6}$ carbocyclyl"). In some embodiments, a carbocyclyl group has 4 to 6 ring carbon atoms ("C$_{4-6}$ carbocyclyl"). In some embodiments, a carbocyclyl group has 5 to 6 ring carbon atoms ("C$_{5-6}$ carbocyclyl"). In some embodiments, a carbocyclyl group has 5 to 10 ring carbon atoms ("C$_{5-10}$ carbocyclyl"). Exemplary C$_{3-6}$ carbocyclyl groups include, without limitation, cyclopropyl (C$_3$), cyclopropenyl (C$_3$), cyclobutyl (C$_4$), cyclobutenyl (C$_4$), cyclopentyl (C$_5$), cyclopentenyl (C$_5$), cyclohexyl (C$_6$), cyclohexenyl (C$_6$), cyclohexadienyl (C$_6$), and the like. Exemplary C$_{3-8}$ carbocyclyl groups include, without limitation, the aforementioned C$_{3-6}$ carbocyclyl groups as well as cycloheptyl (C$_7$), cycloheptenyl (C$_7$), cycloheptadienyl (C$_7$), cycloheptatrienyl (C$_7$), cyclooctyl (C$_8$), cyclooctenyl (C$_8$), bicyclo[2.2.1]heptanyl (C$_7$), bicyclo[2.2.2]octanyl (C$_8$), and the like. Exemplary C$_{3-10}$ carbocyclyl groups include, without limitation, the aforementioned C$_{3-8}$ carbocyclyl groups as well as cyclononyl (C$_9$), cyclononenyl (C$_9$), cyclodecyl (C$_{10}$), cyclodecenyl (C$_{10}$), octahydro-1H-indenyl (C$_9$), decahydronaphthalenyl (C$_{10}$), spiro[4.5]decanyl (C$_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted C$_{3-14}$ carbocyclyl. In certain embodiments, the carbocyclyl group is a substituted C$_{3-14}$ carbocyclyl.

In some embodiments, "carbocyclyl" is a monocyclic, saturated carbocyclyl group having from 3 to 14 ring carbon atoms ("C$_{3-14}$ cycloalkyl"). In some embodiments, a cycloalkyl group has 3 to 10 ring carbon atoms ("C$_{3-10}$ cycloalkyl"). In some embodiments, a cycloalkyl group has 3 to 8 ring carbon atoms ("C$_{3-8}$ cycloalkyl"). In some embodiments, a cycloalkyl group has 3 to 6 ring carbon atoms ("C$_{3-6}$ cycloalkyl"). In some embodiments, a cycloalkyl group has 4 to 6 ring carbon atoms ("C$_{4-6}$ cycloalkyl"). In some embodiments, a cycloalkyl group has 5 to 6 ring carbon atoms ("C$_{5-6}$ cycloalkyl"). In some embodiments, a cycloalkyl group has 5 to 10 ring carbon atoms ("C$_{5-10}$ cycloalkyl"). Examples of C$_{5-6}$ cycloalkyl groups include cyclopentyl (C$_5$) and cyclohexyl (C$_5$). Examples of C$_{3-6}$ cycloalkyl groups include the aforementioned C$_{5-6}$ cycloalkyl groups as well as cyclopropyl (C$_3$) and cyclobutyl (C$_4$). Examples of C$_{3-8}$ cycloalkyl groups include the aforementioned C$_{3-6}$ cycloalkyl groups as well as cycloheptyl (C$_7$) and cyclooctyl (C$_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted C$_{3-14}$ cycloalkyl. In certain embodiments, the cycloalkyl group is a substituted C$_{3-14}$ cycloalkyl.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 2 heteroatoms include, without limitation, triazinanyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include, without limitation, pyrrolyl, furanyl, and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl. Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl. Exemplary 6-membered heteroaryl groups containing 3 or 4 heteroatoms include, without limitation, triazinyl and tetrazinyl, respectively. Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl and phenazinyl.

The term "unsaturated bond" refers to a double or triple bond.

The term "unsaturated" or "partially unsaturated" refers to a moiety that includes at least one double or triple bond.

The term "saturated" refers to a moiety that does not contain a double or triple bond, i.e., the moiety only contains single bonds.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. Compounds described herein contemplates any and all such combinations in order to arrive at a stable compound. Heteroatoms such as nitrogen may have hydrogen substituents and/or any suitable substituent as described herein which satisfy the valencies of the heteroatoms and results in the formation of a stable moiety. Compounds described herein are not intended to be limited in any manner by the exemplary substituents described herein.

The term "halo" or "halogen" refers to fluorine (fluoro, —F), chlorine (chloro, —Cl), bromine (bromo, —Br), or iodine (iodo, —I).

Nitrogen atoms can be substituted or unsubstituted as valency permits, and include primary, secondary, tertiary, and quaternary nitrogen atoms.

In certain embodiments, the substituent present on the nitrogen atom is an nitrogen protecting group (also referred to herein as an "amino protecting group"). Nitrogen protecting groups are well known in the art and include those described in detail in *Protecting Groups in Organic Synthesis*, T. W. Greene and P. G. M. Wuts, $3^{rd}$ edition, John Wiley & Sons, 1999, incorporated herein by reference.

In certain embodiments, the substituent present on an oxygen atom is an oxygen protecting group (also referred to herein as an "hydroxyl protecting group"). Oxygen protecting groups are well known in the art and include those described in detail in *Protecting Groups in Organic Synthesis*, T. W. Greene and P. G. M. Wuts, $3^{rd}$ edition, John Wiley & Sons, 1999, incorporated herein by reference.

The term "heteroatom" refers to an atom that is not hydrogen or carbon. In certain embodiments, the heteroatom is nitrogen. In certain embodiments, the heteroatom is oxygen. In certain embodiments, the heteroatom is sulfur.

These and other aspects of the present invention will be further appreciated upon consideration of the following Examples, which are intended to illustrate certain particular embodiments of the invention but are not intended to limit its scope, as defined by the claims.

EXAMPLES

Electrochemical Behavior of Quinoxalines and Other Active Materials

Quinoxaline electrochemical behavior was characterized in a number of aqueous electrolytes. Quinoxaline itself was purchased from Sigma-Aldrich and had a purity of 99.9%. In all experiments, unless otherwise stated, the quinoxaline concentration was 5 mM, and the supporting salt cation concentration was 1 M. All electrochemical measurements presented in this paper were performed using a Biologic VSP-300 potentiostat. Glassy carbon electrodes were used as working electrodes in voltammetry experiments and were polished using 0.05 μm alumina suspension before performing a new set of measurements.

Cyclic voltammetry (CV) and rotating disk voltammetry (RDV) techniques were employed to probe the electrochemical behavior of quinoxaline. A qualitative CV procedure was performed to characterize the electrochemical behavior of quinoxaline in many different electrolyte compositions. A second series of measurements was carried out to calculate the number of electrons transferred, diffusion coefficients, and transfer coefficients from CV data in certain electrolytes.

Solution resistances were measured prior to electrochemical experiments to be ~5Ω. Due to small peak currents during CV (less than 1 mA), the maximum estimated iR drop was ~5 mV. During qualitative CV experiments, a 75% solution resistance compensation (iR correction) was applied during the experiment to ensure high quality data in untested systems. Quantitative CV techniques were carried with no iR correction as the small potential offset was unlikely to affect experimental results. Additionally, no iR correction was applied during RDV experiments because analyses only considered the limiting RDV current, which is unaffected by ohmic losses.

All potentials given herein are presented versus the reversible hydrogen electrode (RHE), unless otherwise stated. Experimental potentials were determined versus a calibrated Ag/AgCl reference electrode and converted to potentials versus RHE using the Nersnt equation and the pH of the solution, measured with a pH meter. All currents utilized in quantitative calculations were background corrected, assuming the background current was composed of non-faradaic, hydrogen evolution reaction and oxygen reduction reaction currents.

Example 1. Qualitative Cyclic Voltammetry of Quinoxaline Electrolytes

Qualitative CV experiments were carried out in a three-electrode cell with a 0.3 cm diameter glassy carbon electrode (0.071 cm$^2$, CH Instruments), a platinum (Pt) wire counter electrode (CH Instruments) and a Ag/AgCl (3 M NaCl, BASi Inc.) reference electrode. These reference electrodes were calibrated prior to experiments by measuring the open circuit voltage (OCV) between the reference and a Pt wire in 0.5 M H$_2$SO$_4$ while bubbling hydrogen. Three-electrode cells were filled with 10 mL of solution, and the solution was bubbled with argon at a rate of ~50 mL/min for 10 min prior to experiments. The argon bubbling tube was then adjusted such that it provided a blanket of argon gas over the surface of the solution. Then, ten cycles of CV were recorded at a scan rate of 100 mV/s.

From the CV cycling data the redox potential, E'=(E$_{pa}$+E$_{pc}$)/2, was estimated from the 2$^{nd}$ cycle of CV. The ratio of peak separations between the 10$^{th}$ and 2$^{nd}$ cycles ($\Delta E_{pp,10}/\Delta E_{pp,2}$) was calculated as a measure of the increase in peak separation as a function of cycle number. In the ideal electrolyte system, this ratio remains at unity, but if the ratio exceeds a value of one, the peak separation increases with cycle number, indicating that the quinoxaline becomes less electrochemically reversible. The ratios of peak currents between the 10$^{th}$ and 2$^{nd}$ cycles for the cathodic ($i_{pc,10}/i_{pc,2}$) and anodic ($i_{pa,10}/i_{pa,2}$) scans were calculated as an indicator of the chemical reversibility of quinoxaline in a particular electrolyte. If the peak current ratios fall below one, reactant is consumed during either the forward or backward electrochemical reactions by a competing chemical reaction, and this decay in peak current suggests poor quinoxaline stability in a particular electrolyte. A linear slope to the front of an anodic peak (m$_a$) and cathodic peak (m$_c$) was estimated as a rough indicator of the overall reaction rate of either the forward or backward reaction, combining effects of both reaction kinetics and mass-transport. Achieving a slope ratio (m$_a$/m$_c$) of one, indicates an equally fast forward and backward overall reaction rate. The data is presented in Table E1.

Note that in electrolytes where degradation of quinoxaline was observed, the redox potential was measured to be quite low, E°≤−0.75V vs. RHE. These outlying data points may be caused by quinoxaline instability. Due to a rapid degradation process, CV peaks shift so quickly that, even within a single cycle, the peaks move apart by a substantial potential thus distorting the measured redox potentials. These outlying values should not be considered indicators of the actual redox potential. In the cases where quinoxaline exhibited stable performance over multiple CV cycles, the redox potential was E°≈−0.5 V vs. RHE, with slight variation depending on the electrolyte.

When considering the slope ratios between the anodic and cathodic peaks, the ratios for chemically reversible CV data sets varied between 0.45 and 0.65, indicating that the backward overall reaction rate was more sluggish than the forward overall reaction rate. Visually, this difference manifests itself in CVs which are asymmetric about the redox potential. This asymmetry may be caused by different diffusion coefficients and rate constants for the forward and backward reactions. The amount of charge transferred during the cathodic and anodic scans was calculated by integrating the area underneath peaks (first subtracting background current) for every CV cycle to ensure that quinoxaline was chemically reversible. In all electrolytes with pH≥11.4, the ratio of charge transferred between the cathodic and anodic scans, within a particular CV cycle, always exceeded 0.9, indicating that quinoxaline was chemically stable; the total amount of charge input to the three-electrode cells during reduction was ultimately retrieved upon oxidation.

TABLE E1

Quantitative analysis of CV screening for quinoxaline electrolytes.

| Electrolyte | pH | E° vs. RHE (V) | $\Delta E_{pp,10}/\Delta E_{pp,2}$ | $i_{pc,10}/i_{pc,2}$ | $i_{pa,10}/i_{pa,2}$ | $m_a/m_c$ |
|---|---|---|---|---|---|---|
| 1M KCl | 5.4 | −0.80 | 1.85 | 0.56 | 0.57 | 0.75 |
| 0.99M KCl/0.01M KOH | 11.8 | −0.48 | 1.02 | 0.97 | 1.00 | 0.59 |
| 0.9M KCl/0.1M KOH | 12.8 | −0.45 | 1.05 | 0.96 | 0.99 | 0.46 |
| 1M KNO$_3$ † | 7.2 | −0.76 † | 1.04 † | 1.01 † | 0.91 † | 1.51 † |
| 0.99M KNO$_3$/0.01M KOH | 11.7 | −0.52 | 1.01 | 0.97 | 1.00 | 0.64 |
| 0.9M KNO$_3$/0.1M KOH | 12.8 | −0.50 | 1.03 | 0.98 | 0.99 | 0.53 |
| 1M KOH | 13.7 | −0.48 | 1.04 | 0.97 | 0.98 | 0.42 |
| 0.5M K$_2$SO$_4$ ‡ | 8.9 | −0.90 ‡ | 2.16 ‡ | 0.45 ‡ | ‡ | 0.91 ‡ |
| 0.495M K$_2$SO$_4$/0.01M KOH | 11.8 | −0.51 | 1.08 | 0.95 | 0.98 | 0.64 |
| 0.45M K$_2$SO$_4$/0.1M KOH | 12.8 | −0.50 | 1.05 | 0.97 | 0.99 | 0.51 |

TABLE E1-continued

Quantitative analysis of CV screening for quinoxaline electrolytes.

| Electrolyte | pH | E° vs. RHE (V) | $\Delta E_{pp, 10}/\Delta E_{pp, 2}$ | $i_{pc, 10}/i_{pc, 2}$ | $i_{pa, 10}/i_{pa, 2}$ | $m_a/m_c$ |
|---|---|---|---|---|---|---|
| 1M LiCl | 3.8 | −0.94 ‡ | 2.95 ‡ | 0.08 ‡ | ‡ | 0.96 ‡ |
| 0.99M LiCl/0.01M LiOH | 11.4 | −0.52 | 1.05 | 0.96 | 0.99 | 0.63 |
| 0.9M LiCl/0.1M LiOH | 12.1 | −0.53 | 1.04 | 0.99 | 1.00 | 0.51 |
| 1M LiNO$_3$ † | 6.0 | −0.75 † | 1.11 † | 0.91 † | 0.80 † | 1.94 † |
| 0.99M LiNO$_3$/0.01M LiOH | 11.3 | −0.47 | 1.08 | 0.95 | 0.98 | 0.67 |
| 0.9M LiNO$_3$/0.1M LiOH | 12.1 | −0.48 | 1.10 | 0.95 | 0.99 | 0.51 |
| 1M LiOH | 12.7 | −0.55 | 1.00 | 0.96 | 0.98 | 0.45 |
| 0.5M Li$_2$SO$_4$ ‡ | 6.6 | −0.81 ‡ | ‡ | ‡ | ‡ | ‡ |
| 0.495M Li$_2$SO$_4$/0.01M LiOH | 12.0 | −0.52 | 1.06 | 0.95 | 0.96 | 0.55 |
| 0.45M Li$_2$SO$_4$/0.1M LiOH | 12.2 | −0.52 | 1.02 | 0.99 | 1.00 | 0.46 |
| 1M NaC$_2$H$_3$O$_2$ * | 8.6 | −0.68 * | * | * | * | * |
| 0.99M NaC$_2$H$_3$O$_2$/0.01M NaOH | 11.8 | −0.52 | 1.06 | 0.97 | 1.01 | 0.58 |
| 0.9M NaC$_2$H$_3$O$_2$/0.1M NaOH | 12.7 | −0.51 | 1.04 | 0.97 | 1.00 | 0.46 |
| 1M NaHCO$_3$ ‡ | 8.7 | −0.53 ‡ | ‡ | ‡ | ‡ | 1.51 ‡ |
| 0.99M NaHCO$_3$/0.01M NaOH | 8.7 | −0.53 | 2.90 | 0.50 | 0.06 | 1.61 |
| 0.9M NaHCO$_3$/0.1M NaOH | 9.1 | −0.53 | 1.56 | 0.78 | 0.82 | 1.63 |
| 1M NaNO$_3$ | 6.8 | −0.77 | 1.78 | 0.46 | 0.12 | 0.82 |
| 0.99M NaNO$_3$/0.01M NaOH | 11.6 | −0.52 | 1.04 | 0.96 | 1.00 | 0.61 |
| 0.9M NaNO$_3$/0.1M NaOH | 12.5 | −0.52 | 1.07 | 0.98 | 0.98 | 0.50 |
| 1M NaOH | 13.8 | −0.48 | 1.01 | 0.98 | 0.99 | 0.46 |

† Data set showed significant hydrogen evolution reaction current.
‡ Data set showed considerable degradation.
* CV exhibited two distinct reduction and oxidation peaks.

FIG. 3a-f shows cycles 2 and 10 for six different KCl or LiCl based solutions with varying OH⁻ concentrations, and subsequently varying pH ((a) 1 M KCl; (b) 0.99 M KCl, 0.01 M KOH; (c) 0.9 M KCl, 0.1 M KOH; (d) 1 M LiCl; (e) 0.99 M LiCl, 0.01 M LiOH; (f) 0.9 M LiCl, 0.1 M LiOH). Consider the effect of cation size on the electrochemical behavior of quinoxaline. The CV characteristics for a fixed OH⁻ concentration between the LiCl and the KCl data do not vary greatly, suggesting that cation size does not significantly affect quinoxaline behavior. Note that the stability of quinoxaline's electrochemical behavior with respect to changing cation facilitates redox flow battery design because the cation exchange membrane conductivities tend to increase as cation size decreases, enabling lower membrane resistances, without hindering quinoxaline performance (Doyle et al. J. Membr. Sci. 184 (2001) 257-273; Koter et al. J. Membr. Sci. 153 (1999) 83-90)

FIG. 3a-f further demonstrates that the electrochemical reversibility, chemical reversibility, and overall reaction rates all improve as the pH increases. When the electrolyte contained 1 M KCl or 1 M LiCl, significant decay in the peak current over 10 cycles suggests that an electrochemical-chemical (EC) process may have occurred. As OH⁻ was added to the electrolytes, the peak currents remained constant over 10 CV cycles (peak height ratios near unity), suggesting improved chemical reversibility over cases with no added OH⁻. Peak currents were also found to increase with increasing pH. For example, in 1 M KCl, $i_{p,a}$ drops from 0.11 to 0.06 mA between cycles 2 and 10, whereas in 0.99 M KCl/0.01 M KOH, $i_{p,a}$ remains at 0.12 mA across all cycles. Additionally, the peak separation decreases as pH increases (see Table E1), indicating improved electrochemical reversibility with increasing pH. Between the KCl electrolytes with 0.01 and 0.1 M KOH, the peak separation in cycle 2 decreases from 230 to 200 mV. The same general trends apply to all electrolytes of interest as shown in Table E1.

Due to the trend of quinoxaline performance with increasing pH, CV studies were performed on quinoxaline in electrolytes containing 1 M KOH, 1 M NaOH, or 1 M LiOH. Cyclic voltammograms collected in these electrolytes are provided in FIG. 4a-c ((a) 1 M LiOH; (b) 1 M NaOH; (c) 1 M KOH). Across each of these electrolytes, the peak separation (~150 mV) and peak slope ratios (0.41 to 0.45) are approximately the same, and the anodic and cathodic peak currents do not change as a function of cycle number. The CV studies presented in FIG. 4a-c exhibit the best overall quinoxaline CV performance in any of the electrolytes that were screened. Also, only minor differences exist between quantitated CV characteristics in each electrolyte (see Table E1), providing further evidence that the electrochemical behavior of quinoxaline appears independent of monovalent cation size (ranging across Li⁺, Na⁺, and K⁺).

The electrolyte screening process also considered the effects of different anions (Cl⁻, SO$_4^-$, NO$_3^-$, C$_2$H$_3$O$_2^-$, and HCO$_3^-$) on quinoxaline electrochemical performance. The initially surprising poor electrochemical performance in NaHCO$_3$-based solution can be reconciled by recalling the buffering capability of the bicarbonate ions. Indeed, the pH of the NaHCO$_3$-based solution remained relatively low, leading to quinoxaline instability.

Comparing the CVs in FIGS. 3a-f and 4a-c, as well as the data available in Table E1, shows variation in quinoxaline electrochemical performance for electrolytes containing different anions. The electrolytes containing only the alkaline salts (LiOH, NaOH, and KOH) demonstrated improved electrochemical performance in the CV screening experiments. However, for the electrochemical systems utilizing quinoxaline, performance in less caustic electrolytes (lower pH) than the alkaline salts may also be prepared, including, for example, sulfate (SO$_4^{2-}$) and chloride (Cl⁻) anions which have small peak separation (<220 mV at 0.01 M OH⁻, <200 mV at 0.1 M OH⁻) and peak current ratios close to unity.

Example 2. Quantitative Electrochemical Experiments of Quinoxaline Electrolytes

A set of quantitative experiments were designed to calculate the number of electrons transferred, diffusion coefficients, and transfer coefficients using the Randles-Sevcik equation for irreversible CVs (Eq. (E1)) and the Levich equation (Eq. (E2)). In Eq. (E1), $i_p$ is the peak current, n is the number of electrons transferred, α is the transfer coefficient, A is the electrode surface area, F is Faraday's constant, C is the reactant concentration, s is the scan rate, R is the universal gas constant, T is temperature, and D is the diffusion coefficient (e.g., see Compton et al. *Understanding Voltammetry*, 2nd ed., Imperial College Press, London, 2011). Additionally, in Eq. (E2), $i_L$ is the RDV limiting current, ω is the electrode rotation rate, and v is the kinematic viscosity (e.g., see Bard et al. *Electrochemical Methods: Fundamentals and Applications*, John Wiley & Sons, Danvers, 2001). Kinematic viscosities were determined from dynamic viscosities, which were interpolated from tables by Zaytsev and Aseyev (Zaytsev et al. *Properties of Aqueous Solutions of Electrolytes*, 1st ed., CRC Press, Boca Raton, 1992), and electrolyte densities, which were measured using a balance and known solution volume. All remaining variables are constants or were determined by the experimental design.

$$i_p = 0.496 nAFC \left( \frac{n\alpha FsD}{RT} \right)^{\frac{1}{2}} \quad \text{Eq. (E1)}$$

$$i_L = 0.62 nFAD^{\frac{2}{3}} \omega^{\frac{1}{2}} v^{\frac{-1}{6}} C \quad \text{Eq. (E2)}$$

Quantitative CV and RDV experiments were carried out in a water-jacketed three-electrode cell. Chilled water at a temperature of 295 K (22° C.) was continuously passed through the water jacket in order to maintain a constant temperature throughout the experiment. A rotating disk electrode with a 0.5 cm diameter glassy carbon electrode (0.196 cm$^2$) was used as a working electrode. A coiled Pt wire used as a counter electrode was housed in a glass compartment that was separated from the main chamber by a porous frit. Both chambers were filled with the same bulk electrolyte. The reference electrode was a double junction Ag/AgCl (10% KNO$_3$), which had been calibrated against a commercially available reversible hydrogen electrode (BAS Inc.) in 1 M NaHCO$_3$ solution by measuring OCV between the two electrodes. All cell components were purchased from Pine Instruments Co., including the rotator and motor used in RDV experiments.

Cells were filled with 80 mL of solution, and the solution was bubbled with argon using a porous glass frit at a rate of ~50 mL/min for 1 h before taking any electrochemical measurements. After 1 h, the argon gas bubbling stream was switched to an argon gas blanket above the solution. Three cycles of CV, with a stationary electrode, were recorded at each of the following scan rates: 5, 10, 20, 50, and 100 mV/s. Between CV and RDV experiments, the glassy carbon electrode was re-polished before beginning RDV experiments. Then, two CV scans were performed at a 10 mV/s scan rate for each of the following RDV rotation speeds: 100, 400, 900, 1600, and 2500 rpm. Quantitative voltammetry experiments were performed in triplicate using freshly prepared solution and freshly polished glassy carbon electrodes for each trial.

FIGS. 5a-e and FIG. 6a-e show CVs and RDVs for five electrolytes tested under the following conditions: (a) 0.495 M K$_2$SO$_4$/0.01 M KOH (pH=11.8); b) 0.45 M K$_2$SO$_4$/0.1 M KOH (pH=12.9); c) 0.99 M KCl/0.01 M KOH (pH=11.8); d) 0.9 M KCl/0.1 M KOH (pH=12.9); e) 1 M KOH (pH=13.7).

CV experiments were performed at five different scan rates, and RDV experiments were performed at five different rotation speeds for each electrolyte of interest. The aim of these experiments was to determine the number of electrons transferred during a quinoxaline redox reaction, the diffusion coefficients of quinoxaline and its reduced species in each electrolyte, and the transfer coefficients of the redox reactions. FIG. 5a-e and FIG. 6a-e display the third cycle of typical CV data at different scan rates and the second cathodic scan of typical RDV data at different rotation rates, respectively.

In order to quantitatively determine the number of electrons transferred, a numerical fitting technique was employed. Among the irreversible Randles-Sevcik (Eq. (E1)) and Levich (Eq. (E2)) equations, there are four unknown variables: the number of electrons transferred, n, two diffusion coefficients, $D_O/D_R$, and the transfer coefficient, α. Thus, each variable was used as a parameter to numerically fit three analytical equations (Levich, Randles-Sevcik cathodic, Randles-Sevcik anodic) to the experimental data. For every electrolyte tested, one fit was performed for each combined trial of CV (a total of five scan rates) and RDV (a total of five rotation speeds), coupling the data from both experimental methods. Numerical fitting was performed using a constrained optimization function in MATLAB, which aimed to minimize the objective function (Z) shown in Eq. (E3). Variables $i_{a,exp}$, $i_{c,exp}$, and $i_{a,exp}$ are the experimentally measured anodic CV peak current, cathodic CV peak current, and RDV limiting current, respectively. The variables $i_{a,sim}$, $i_{c,sim}$, and $i_{L,sim}$ are the simulated current analogues of the experimental data, which were computed from the numerically determined parameter values via the optimization function. The objective function aims to minimize the difference between the experimentally measured currents and the simulated currents using a method of least-squares. Constraints on parameters for the optimization function were selected using typically accepted ranges of values for the physical constants of interest.

$$Z = \frac{(i_{a,exp} - i_{a,sim})^2}{|i_{a,exp}|} + \frac{(i_{c,exp} - i_{c,sim})^2}{|i_{c,exp}|} + \frac{(i_{L,exp} - i_{L,sim})^2}{|i_{L,exp}|} \quad \text{Eq. (E3)}$$

Table E2 shows the results of the numerical fitting analysis, where n was fitted to the Levich and the irreversible Randles-Sevcik equations. Since the aim of the fitting analysis was to determine a number of electrons transferred during an electrochemical reaction, an integer value for number of electrons must be identified, and, as can be clearly seen from Table E2, the numerical analysis yielded non-integer values. The numerical fitting method only identifies a value for n that best fits the data, so, in order to make physical sense of this numerical data, a nearest integer value should be identified. The mean calculated value for n from the electrolytes in Table E2 was found to be $n_{avg}$=2.34; by rounding this value to its nearest integer, n=2, the numerically determined data in Table E2 strongly suggests that quinoxaline redox processes incorporate two electron transfers. Further, each entry in Table E2 shows the 95% confidence interval calculated from the precision uncertainty of the three numerical fits for every electrolyte condition.

TABLE E2

Values for the number of electrons transferred, n, during quinoxaline reduction and re-oxidation as determined from the numerical fitting method.

| Electrolyte | pH | n |
|---|---|---|
| 0.495M $K_2SO_4$/0.01M KOH | 11.8 | 2.26 ± 0.33 |
| 0.45M $K_2SO_4$/0.1M KOH | 12.9 | 2.54 ± 0.43 |
| 0.99M KCl/0.01M KOH | 11.8 | 1.89 ± 0.21 |
| 0.9M KCl/0.1M KOH | 12.9 | 2.90 ± 0.03 |
| 1M KOH | 13.7 | 2.34 ± 0.72 |

Van der Meer studied quinoxaline electrochemistry in dimethylformamide (DMF), with ~0.1 M tetraethylammonium perchlorate supporting salt, and found that in DMF, quinoxaline could be reduced to a divalent anionic state through two separate, one electron reduction waves (van der Meer et al. *Recl. Trav. Chim. Pays-Bas.* 87 (1968) 746-754). By contrast, in this aqueous work, a single wave with two electron reduction is observed. Such differences in charge transfer mechanisms have been previously reported for aromatic hydrocarbons in aqueous and non-aqueous solvents. For example, quinones may reduce via a single wave, two electron process in $H_2O$, whereas they reduce by two successive single-electron processes in aprotic solvents (e.g., see Quan et al. *J. Am. Chem. Soc.* 129 (2007) 12847-12856). This observation can be rationalized by the following thermodynamic argument: due to hydrogen bonding effects, quinone redox potentials in $H_2O$ of the two electron transfers are so close together that the peaks merge into a single wave, and contrastingly, due to weaker interactions with the solvent, quinone redox potentials in aprotic systems are farther apart, creating two distinct redox peaks (e.g., see Quan et al.). This concept can likely be extended to quinoxaline, explaining the discrepancy between Van der Meer's double wave phenomenon in DMF and the single wave reduction identified in aqueous solution. Thus, on the basis of the experimental evidence and prior literature, quinoxaline exhibits a two-electron transfer process during redox reactions, leading to a theoretical capacity of 410 mAh/g.

Once the two electron transfer behavior of quinoxaline had been identified, the numerical fitting procedure was performed a second time, fixing n=2 to obtain more reliable values for diffusion and transfer coefficients. Table E3 shows the calculated diffusion and transfer coefficients in each electrolyte of interest, along with the 95% confidence intervals calculated from the precision uncertainty of three experimental trials. In each electrolyte, the diffusion coefficient of quinoxaline was greater (~1.1-1.7×) than the diffusion coefficient of the reduced species, in line with observations of quinoxaline cyclic voltammetry, where the oxidation peak is always wider and shorter than the reduction peak. The diffusion coefficient was also estimated using the Stokes-Einstein relationship and assuming the hydrodynamic radius of quinoxaline was equivalent to the mean of its minor and major axes (0.382 nm). This calculated diffusion coefficient ($5.7 \times 10^{-6}$ $cm^2$ $s^{-1}$) is in good agreement with the values in Table E3. Further, the transfer coefficient for the forward reaction was found to be α≈0.6, implying a faster chemical reaction rate during reduction and agreeing with the asymmetry of the CV data sets.

TABLE E3

Diffusion coefficients for quinoxaline ($D_O$) and for the reduced species ($D_R$) and transfer coefficients (α) for the reduction (forward) reaction in the five electrolytes.

| Electrolyte | pH | $D_O$ ($10^{-6}$ $cm^2$/s) | $D_R$ ($10^{-6}$ $cm^2$/s) | α |
|---|---|---|---|---|
| 0.495M $K_2SO_4$/0.01M KOH | 11.8 | 6.4 ± 0.7 | 4.8 ± 1.0 | 0.59 ± 0.00 |
| 0.45M $K_2SO_4$/0.1M KOH | 12.9 | 7.3 ± 1.7 | 4.4 ± 0.4 | 0.60 ± 0.00 |
| 0.99M KCl/0.01M KOH | 11.8 | 6.0 ± 0.6 | 4.9 ± 2.2 | 0.59 ± 0.04 |
| 0.9M KCl/0.1M KOH | 12.9 | 6.7 ± 0.4 | 5.9 ± 1.0 | 0.62 ± 0.02 |
| 1M KOH | 13.7 | 5.8 ± 0.9 | 4.0 ± 1.7 | 0.60 ± 0.05 |

Example 3. Solubility Studies of Quinoxaline Solutions

The solubility limit (at room temperature) of quinoxaline in several electrolytes and DI $H_2O$ was estimated using the following method. Scintillation vials were filled with a known volume of electrolyte, and quinoxaline was added in 0.5 M increments. The vials were then vortex sonicated for ~5 min between quinoxaline additions. Once no more quinoxaline could be dissolved into the vial, the solubility limit was recorded. This method was accurate to the lowest 0.5 M concentration, and solution volume changes due to quinoxaline addition were not considered.

The estimated solubility limits of quinoxaline in each of these above electrolytes and DI $H_2O$ are listed in Table E4. Electrolytes containing $K_2SO_4$ or only KOH were able to dissolve up to 0.5 M quinoxaline. In contrast, solutions containing KCl were able to dissolve up to 4.0 M quinoxaline, and DI $H_2O$ was able to dissolve 4.5 M quinoxaline. The high solubility of quinoxaline in KCl-based electrolytes offers a pathway to redox electrolytes with high volumetric and gravimetric capacity which, in turn, may lead to energy dense redox flow batteries. The wide range of quinoxaline solubilities in different electrolytes couples with three distinct quinoxaline precipitation behaviors upon solution saturation. In 1 M KOH, solid dendritic crystals were observed after solution saturation at the bottom of the vial. In electrolytes containing $K_2SO_4$, a three phase system consisting of solid dendritic crystals (bottom), an aqueous phase (middle), and an organic phase (top) were observed. Finally, in DI $H_2O$ and electrolytes containing KCl, a bed of small dendritic crystal precipitates was observed throughout the liquid.

TABLE E4

Estimated solubility limits of quinoxaline in certain alkaline electrolytes and DI H₂O.

| Electrolyte | pH | Solubility Limit (M) |
| --- | --- | --- |
| 0.495M K$_2$SO$_4$/0.01M KOH | 11.8 | 0.5† |
| 0.45M K$_2$SO$_4$/0.1M KOH | 12.9 | 0.5† |
| 0.99M KCl/0.01M KOH | 11.8 | 4.0‡ |
| 0.9M KCl/0.1M KOH | 12.9 | 4.0‡ |
| 1M KOH | 13.7 | 0.5* |
| DI H$_2$O | 7.0 | 4.5‡ |

†Three phase separation;
‡Bed of small crystals;
*Dendritic precipitation of crystals.

Example 4. Electrochemical Experiments of Other Electrolytes

Electrochemical experiments were carried out using other electrolytes. When 5 mM quinoxaline in 1 M potassium chloride with no added base at a glassy carbon electrode was prepared, the observed cathodic anodic currents decreased with repeated cycling. When 5 mM quinoxaline in 1 M potassium chloride with 10 mM potassium hydroxide was prepared, no decrease in peak currents was observed after 100 or 200 cycles.

Cyclic voltammograms of quinoxaline and 2-methylquinoxaline were obtained with a 20 mV/s scan rate, platinum working and counter electrodes and Ag/AgCl reference electrode. In addition, cyclic voltammograms of higher concentration solutions of quinoxaline were obtained in 1 M KOH.

Solutions containing both positive and negative redox active material were used for additional CV experiments. CVs of varying concentrations of positive redox active material potassium ferrocyanide and negative redox active material quinoxaline in 0.5 M potassium sulfate show that the two redox active materials are compatible in the same solution. The concentrations of redox active materials used were: 20 mM K$_4$Fe(CN)$_6$ and 10 mM quinoxaline; 40 mM K$_4$Fe(CN)$_6$ and 20 mM quinoxaline; and 20 mM K$_4$Fe(CN)$_6$ and 20 mM quinoxaline. CVs of positive redox active material tiron (5 mM) and negative redox active material quinoxaline (5 mM) in 0.5 M sodium sulfate show that the two redox active materials are compatible in the same solution. A glassy carbon working electrode, platinum counter, and Ag/AgCl reference electrode were used in all experiments, and CVs were recorded at 5, 10, 20, 50, and 100 mV/s.

Example 5. Electrochemical Experiments of Other Organic Active Materials

The electrochemistry of several other organic active materials, which may be employed as a type of redox active material were also explored. A glassy carbon working electrode, platinum counter, and Ag/AgCl reference electrode were used in all experiments. The cyclic voltammograms are shown in FIG. 9a-e: (a) 50 mM 1,2-dihydroxy-3,5-benzenedisulfonic acid disodium salt (tiron) in 0.5 M sulfuric acid; (b) 50 mM 1,2-dihydroxy-3,5-benzenedisulfonic acid disodium salt (tiron) in 0.5 M sodium sulfate; (c) 50 mM 1,2,4-trihydroxy-3,5-benzenedisulfonic acid disodium salt in 0.5 M sulfuric acid; (d) 5 mM dibenzylviologen dichloride in 0.5 M sodium sulfate; and (e) 1.85 g/L indigo carmine in 1 M sulfuric acid.

Example 6. Quinoxaline/Tiron Cell

A negative electrolyte was prepared with 0.1 M quinoxaline as active material in 0.2 M potassium hydroxide with 0.067 M potassium chloride and 0.5 M potassium sulfate as supporting electrolytes. A positive electrolyte was prepared with 0.1 M 1,2-dihydroxy-3,5-benzenedisulfonic acid disodium salt (tiron) in 0.4 M sulfuric acid with 0.5 M potassium sulfate as supporting electrolyte. The electrolytes were loaded on opposite sides of a SWAGELOK® cell. The cell comprises two porous graphite felt electrodes (GFD3 from SGL carbon) inserted into a 6 mm diameter, 2.8 mm depth well cut into a stainless steel SWAGELOK® part, with a NAFION® 117 membrane placed between the two electrodes as a separator and insulator. The cell assembly is screwed together to ensure good sealing and pressure. The negative and positive electrodes were presoaked in the respective electrolytes overnight, and the membrane was pretreated to convert it to the lithium exchanged form. The cell was cycled with a charge and discharge current of 0.1 mA between voltage limits of 0.6 and 1.6 V. Using the nominal cross-sectional area of the well (0.283 cm$^2$), a current density of 0.353 mA/cm$^2$ was calculated. Cycling data (voltage vs. time) between 0 and 175 minutes is provided in FIG. 7a. Current efficiencies (CE) and energy efficiencies (EE) are plotted vs. cycle number in FIG. 7b.

Example 7. Quinoxaline/Ferrocyanide Cell

A negative electrolyte was prepared with 0.1 M quinoxaline as active material in 0.2 M potassium hydroxide with 0.067 M potassium chloride and 0.5 M potassium sulfate as supporting electrolytes. A positive electrolyte was prepared with 0.08 M potassium ferrocyanide in 0.2 M potassium hydroxide with 0.5 M potassium sulfate as supporting electrolyte. The electrolytes were loaded on opposite sides of a SWAGELOK® cell with a lithiated NAFION® 117 membrane as a separator. The cell and assembly are as described in the above example. The cell was cycled with a charge and discharge current of 0.5 mA between voltage limits of 0.6 and 1.6 V. Using the nominal cross-sectional area of the well (0.283 cm$^2$), a current density of 1.76 mA/cm$^2$ was calculated. Cycling data (voltage vs. time) between 150 and 170 minutes is provided in FIG. 8a. Current efficiencies (CE) and energy efficiencies (EE) for are plotted vs. cycle number in FIG. 8b.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to certain issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that certain changes and modifications to this description may be made without departing from the spirit or scope of the present invention, as defined in the following claims.

What is claimed is:
1. A redox flow battery comprising:
a first aqueous electrolyte comprising a first type of redox active material;
a second aqueous electrolyte comprising a second type of redox active material;
wherein the first type of redox active material comprises a quinoxaline moiety, a salt of the quinoxaline moiety, or a mixture thereof.
2. The battery of claim 1, further comprising a first electrode in contact with the first aqueous electrolyte and a second electrode in contact with the second aqueous electrolyte.
3. A method of storing energy, comprising applying a potential difference across the first electrode and second electrode of a flow battery of claim 2, wherein the first type of redox active material is reduced.
4. The method of claim 3, wherein a quinoxaline moiety in the first type of redox active material is converted from a compound comprising Formula (I):

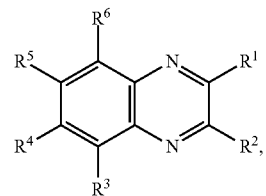

or salt thereof, to a compound comprising Formula (I-B):

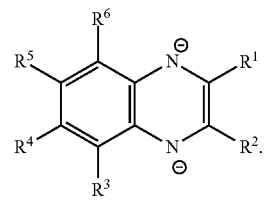

5. A method of releasing energy, comprising applying a potential difference across the first electrode and second electrode of a flow battery of claim 2, wherein the first type of redox active material is oxidized.
6. The method of claim 5, wherein a quinoxaline in the first type of redox active material is converted from a compound comprising Formula (I-B):

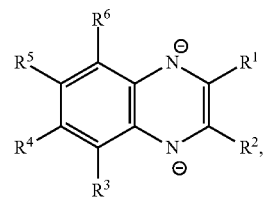

or salt thereof, to a compound comprising Formula (I):

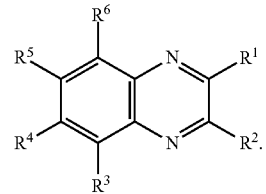

7. The battery of claim 1, further comprising a separator between the first aqueous electrolyte and second aqueous electrolyte.
8. The battery of claim 1, wherein the first aqueous electrolyte has a pH between about 7 and about 10, or between about 10 and about 12, or between about 12 and about 14.
9. The battery of claim 1, wherein the first type of redox active material is present in the first aqueous electrolyte in a concentration of at least about 0.5 M, at least about 1 M, at least about 2 M, at least about 4 M, or at least about 6 M.
10. The battery of claim 1, wherein the first type of redox active material is present in the first aqueous electrolyte in a concentration of between about 0.5 and about 2 M.

11. The battery of claim 1, wherein the quinoxaline moiety comprises a compound comprising Formula (I):

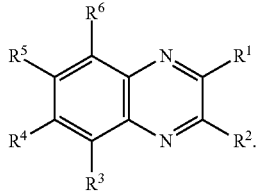

(I)

or a salt thereof, wherein:
each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$;
each $R^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group; and
optionally, any two adjacent groups selected from $R^1$, $R^2$, $R^3$, $R^4$, $R^5$, and $R^6$ are joined to form an optionally substituted aryl or optionally substituted heteroaryl ring.

12. The battery of claim 11, wherein:
each of $R^1$, $R^2$, $R^3$, $R^4$, $R^5$, and $R^6$ is independently hydrogen, halogen, optionally substituted alkyl, optionally substituted haloalkyl, —CN, —NO$_2$, —OR$^a$, —N(R$^a$)$_2$, —C(=O)OR$^a$, or —S(=O)$_2$OR$^a$; and
each $R^a$ is independently hydrogen or optionally substituted alkyl.

13. The battery of claim 11, wherein none of, any two of, any three of, any four of, or any five of $R^1$, $R^2$, $R^3$, $R^4$, $R^5$, and $R^6$ are hydrogen.

14. The battery of claim 11, wherein the compound of Formula (I) comprises the structure:

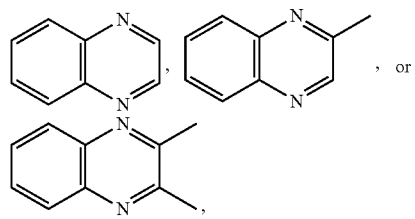

or a salt thereof.

15. The battery of claim 1, wherein the first aqueous electrolyte comprises between 0.5 and 5 M LiCl, between 0.5 M and 5 M NaCl, or between 0.5 M and 5 M KCl, or a mixture thereof such that the combined concentration is between 0.5 M and 5 M.

16. The battery of claim 1, wherein the quinoxaline moiety comprises Formula (IV):

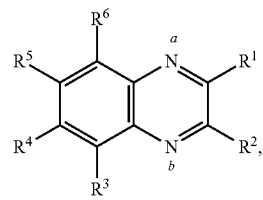

(IV)

or a salt thereof, wherein:
each $R^1$, $R^2$, $R^3$, $R^4$, $R^5$, and $R^6$ is independently hydrogen, halogen, optionally substituted alkyl, optionally substituted carbocyclyl, optionally substituted heterocyclyl, optionally substituted aryl, optionally substituted heteroaryl, —CN, —NO$_2$, —OR$^a$, —N(R$^a$)$_2$, —C(=O)R$^a$, —C(=O)OR$^a$, —S(=O)$_2$R$^a$, or —S(=O)$_2$OR$^a$;
each $R^a$ is independently hydrogen, optionally substituted alkyl, optionally substituted carbocyclyl, optionally substituted heterocyclyl, optionally substituted aryl, optionally substituted heteroaryl, an oxygen protecting group, or a nitrogen protection group;
provided at least one of the nitrogen labeled a, the nitrogen labeled b, $R^1$, $R^2$, $R^3$, $R^4$, $R^5$, and $R^6$ is associated with a metal center, and
wherein the metal center is optionally associated with one or more auxiliary ligands.

17. The battery of claim 1, wherein the second type of redox active material comprises a hexacyanoiron complex, a quinone, a hydroquinone, or an organic dye, or a salt or mixture thereof.

18. The battery of claim 17, wherein the second type of redox active material comprises ferrocyanide, ferricyanide, 1,2-dihydroxy-3,5-benzenedisulfonate, 1,2,4-trihydroxy-3,5-benzenedisulfonate, or indigo carmine, a salt of any one of these compounds, or a mixture thereof.

19. The battery of claim 1, further comprising:
a first circulation loop comprising a storage tank containing the first aqueous electrolyte, piping for transporting the first aqueous electrolyte, a chamber in which a first electrode is in contact with the first aqueous electrolyte, and a pump to circulate the first aqueous electrolyte through the first circulation loop;
optionally a second circulation loop comprising a storage tank containing the second aqueous electrolyte, piping for transporting the second aqueous electrolyte, a chamber in which a second electrode is in contact with the second aqueous electrolyte, and a pump to circulate the second aqueous electrolyte through the second circulation loop; and
control hardware and software.

20. The battery of claim 1, wherein the first type of redox active material is present in the first aqueous electrolyte in a concentration of between about 2 M and about 4 M.

21. The battery of claim 1, wherein the first type of redox active material is present in the first aqueous electrolyte in a concentration of between about 4 M and about 6 M.

22. The battery of claim 1, wherein the first type of redox active material is present in the first aqueous electrolyte in a concentration of between about 6 M and about 10 M.

* * * * *